United States Patent
Maeda et al.

(10) Patent No.: US 7,955,675 B2
(45) Date of Patent: Jun. 7, 2011

(54) WELD JOINT FOR FUEL TANK

(75) Inventors: Takayuki Maeda, Aichi-ken (JP); Atsuo Miyajima, Aichi-ken (JP); Kazushige Sakazaki, Aichi-ken (JP); Kentaro Sugita, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 724 days.

(21) Appl. No.: 11/951,549

(22) Filed: Dec. 6, 2007

(65) Prior Publication Data

US 2008/0138554 A1 Jun. 12, 2008

(30) Foreign Application Priority Data

Dec. 8, 2006 (JP) .................................. 2006-332679
Nov. 27, 2007 (JP) .................................. 2007-306416

(51) Int. Cl.
*B32B 27/08* (2006.01)
*B29C 47/00* (2006.01)
*F16L 13/02* (2006.01)
*B65D 57/00* (2006.01)

(52) U.S. Cl. ..................... 428/36.6; 428/36.9; 285/21.1; 285/423

(58) Field of Classification Search ................. 428/36.6, 428/36.9; 285/21.1, 423
See application file for complete search history.

(56) References Cited

U.S. PATENT DOCUMENTS

| 6,398,059 | B1 | 6/2002 | Hayashi et al. |
| 6,422,261 | B1 * | 7/2002 | DeCapua et al. ............. 137/202 |
| 6,676,165 | B2 | 1/2004 | Iio et al. |
| 6,733,048 | B2 | 5/2004 | Kurihara et al. |
| 2002/0121517 | A1 | 9/2002 | Aoki et al. |
| 2002/0159825 | A1 | 10/2002 | Ito et al. |
| 2003/0173776 | A1 | 9/2003 | Morohoshi et al. |
| 2006/0088374 | A1 | 4/2006 | Nishiyama et al. |
| 2006/0088375 | A1 | 4/2006 | Nishiyama et al. |
| 2007/0000928 | A1 | 1/2007 | Nishiyama et al. |

FOREIGN PATENT DOCUMENTS

| JP | 2002254938 | 9/2002 |
| JP | 2004293324 | 10/2004 |
| JP | 2006143172 | 6/2006 |

* cited by examiner

*Primary Examiner* — Rena L Dye
*Assistant Examiner* — James Yager
(74) *Attorney, Agent, or Firm* — Andrus, Sceales, Starke & Sawall, LLP

(57) ABSTRACT

A weld joint has a weld portion for being welded and bonded to a rim portion around an opening of a resin fuel tank. The weld portion is made of a resin alloy material that is obtained by alloying EVOH or PA with a modified HDPE. A highly-weldable layer is provided in an extremity portion of the weld portion throughout an entire circumference of the weld portion. The highly-weldable layer is made of HDPE and/or a modified HDPE having good weldability to the resin fuel tank. An extremity end surface of the highly-weldable layer serves as a weld surface for welding the weld portion to the resin fuel tank.

8 Claims, 21 Drawing Sheets

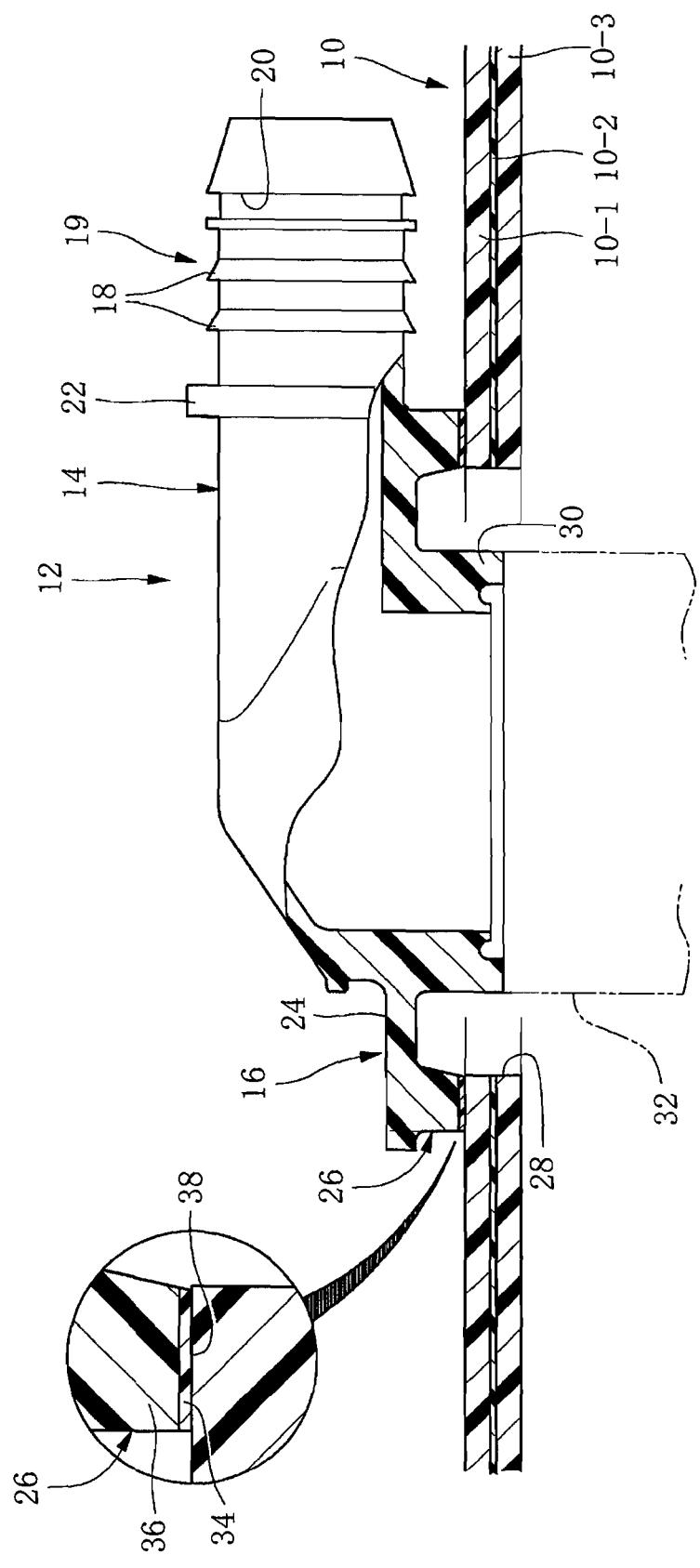

WELD JOINT FOR FUEL TANK

BACKGROUND OF THE INVENTION

1. Field of the Invention

The present invention relates to a resin joint for a resin fuel tank for connection to a piping tube or a connector, more specifically to a resin weld joint for being bonded to the resin fuel tank by heat-welding to construct a connecting portion between the resin fuel tank and the piping tube or the connector.

2. Description of the Related Art

A fuel tank equipped in a motor vehicle integrally has a joint that provides connection between the fuel tank and a tube, a connector or the like for introducing a fuel that is fed via a filler opening to the fuel tank.

Here, for example, for the tube introducing a fuel from the filler opening to the fuel tank, a tube made of rubber (rubber hose) has been used conventionally. In recent years, however, environmental regulations have been increasingly requiring to restrict a fuel from permeating out through a hose in view of environmental protection. This results in that, for a piping tube, employed is a rubber-resin composite hose of a composite of a rubber hose and a gas-barrier resin layer of fuel impermeability, a rubber tube formed of a fluoro-rubber of fuel impermeability or a resin tube made solely of resin.

For example, a connecting structure as shown in FIGS. 18A and 18B has been conventionally employed for connecting between such a tube and a fuel tank.

In FIGS. 18A and 18B, reference numeral 200 indicates a fuel tank made of resin, and reference numeral 202 indicates a weld joint also made of resin. The weld joint 202 is bonded integrally to the fuel tank 200 through application of heat-welding, or thermal-welding.

The weld joint 202 has a tubular portion 204 adapted for being inserted relatively into a tube, and an annular flange portion 206 projecting from an outer peripheral surface of the tubular portion 204.

Reference numeral 208 indicates a resin tube for introducing a fuel that is fed via a filler opening to the fuel tank 200. As shown in FIG. 18B, the resin tube 208 has a corrugated portion 210 that provides the resin tube 208 with flexibility.

In FIGS. 18B and 19, reference numeral 212 indicates a connector (quick connector). The resin tube 208 is connected to the weld joint 202 via the connector 212.

The connector 212 has a connector body 214 made of resin and a retainer 216 also made of resin.

The connector body 214 has a nipple portion 218 on one axial end thereof, and a socket like retainer holding portion 230 on the other axial end thereof. The retainer 216 is inserted resiliently in and held in the retainer holding portion 230.

The nipple portion 218 is press-fitted or force-fitted relatively in the resin tube 208 and secures the resin tube 208 thereon. The nipple portion 218 has a stop portion that is provided with a plurality of annular projecting portions 232 axially spaced on its outer peripheral surface. The stop portion has a saw-toothed cross-section. In an inner periphery of the nipple portion 218, a plurality of O-rings (seal rings) 234 are retained.

On the other hand, the socket like retainer holding portion 230 is formed with a circular arc window portion 236, and a partial-ring-shaped portion 238 of a corresponding circular arc shape.

The retainer 216 is entirely resiliently deformable in a radial direction. The retainer 216 has a circular arc groove 240 for resiliently fitting to the partial-ring-shaped portion 238 of the retainer holding portion 230, a tapered guide surface 242 for assisting axial insertion of the flange portion 206 of the weld joint 202 and assisting resilient diametrical expansion of the entire retainer 216, and circular arc fit-in slits 244 for fit-engaging the flange portion 206 therein.

In this connecting structure, an end portion of the resin tube 208 is forcibly press-fitted on the nipple portion 218 of the connector body 214, and is secured thereto.

During that state, the end portion of the resin tube 208 is deformed and diametrically expanded or flared by being press-fitted on the nipple portion 218 as shown in FIG. 18B, and radially tightens against the nipple portion 218 with a large tightening force.

This tightening force and a wedging function of the annular projecting portions 232 of the nipple portion 218 retain the end portion of the resin tube 208 onto the connector body 214 in a secured state.

Then, while the retainer 216 is mounted and held in the connector body 214, the connector 212 is fitted on the tubular portion 204 of the weld joint 202.

During that time, the retainer 216 held in the connector body 214 is resiliently deformed and diametrically expanded or flared by the flange portion 206. As soon as the flange portion 206 reaches the fit-in slits 244, the retainer 216 is resiliently deformed and diametrically contracted again to engage the flange portion 206 in the fit-in slits 244.

At the same time, a leading end of the tubular portion 204 with respect to the flange portion 206 fits in the O-rings 234 in an inner periphery of the connector body 214, and thereby an air tight seal is provided between the tubular portion 204 and the connector body 214.

On the other hand, aside from this, there is an idea that the resin tube 208 is connected to the weld joint 202 by putting or fitting the resin tube 208 immediately (directly) on the tubular portion 204 of the weld joint 202, without use of the above-mentioned connector 212.

Meanwhile, such weld joint adapted for connecting to a connector (quick connector) or connecting directly to a fuel piping tube is integrally bonded to the fuel tank by heat-welding as stated above. However, the following problem arises when a connecting portion for the tube is formed by bonding the weld joint integrally to a fuel tank through application of heat-welding.

Conventionally, for a material of an outer layer of the fuel tank, high density polyethylene (HDPE) resin has been used. So, the weld joint to be bonded integrally to the fuel tank is required to be weldable to the material of the outer layer.

Accordingly, there is an idea that the entire weld joint including a tubular portion is made of the same material of HDPE resin. HDPE resin is excellent in weldability to the fuel tank, but insufficient in fuel permeation resistance (fuel impermeability). This causes a problem that a fuel permeates out through this portion.

Patent Document 1 stated below discloses a weld joint for the purpose of solving the problem relative to fuel impermeability. According to Patent Document 1, the weld joint is constructed by radially laying an outer layer having weldability to a fuel tank on an inner layer made of resin having fuel impermeability (gas-barrier property).

FIG. 20 shows an illustrative example of such weld joint.

In FIG. 20, reference numeral 246 indicates a resin fuel tank constructed by laying an outer layer 246-1 made of HDPE resin, a gas-barrier layer 246-2 made of ethylene-vinyl alcohol copolymer (EVOH) resin of superior fuel impermeability and an inner layer 246-3 made of HDPE resin, on one another.

Reference numeral 248 indicates a resin weld joint that is welded integrally to the fuel tank 246. The weld joint 248 has a tubular portion 252 serving as a connecting portion (a plug-in portion) to a tube 258, and a weld portion 250 at a base end portion thereof. The weld joint 248 is bonded to the fuel tank 246 at the weld portion 250 by heat-welding.

The tubular portion 252 has an outer layer 254 and an inner layer 256. The outer layer 254 and the inner layer 256 are made of different resin materials. Specifically, the outer layer 254 is made of the same material as the weld portion 250, and the inner layer 256 is made of gas-barrier material such as polyamide (PA) resin that is more excellent in fuel impermeability than the outer layer 254.

Meantime, reference numeral 260 indicates a hose band for securing the tube 258 on the tubular portion 252 in a fit-on state by clamping the tube 258.

In the weld joint 248 of this construction, the outer layer 254 of the tubular portion 252 and the weld portion 250 are made of HDPE resin of the same material as the outer-layer 246-1 of the fuel tank 246. As stated above, HDPE resin has good weldability to the fuel tank 246. But, HDPE resin does not have sufficient fuel impermeability, in the weld joint 248 as shown in FIG. 20, the inner layer 256 made of the gas-barrier material is provided in the tubular portion 252. Therefore, fuel impermeability is ensured for the tubular portion 252. However, the weld portion 250 of HDPE resin is left, so to speak, in exposed condition.

So, a weld joint 262 as shown in FIG. 21 is proposed in the previous patent application (Patent Document 2 as stated below). The entire weld joint 262, specifically the entire weld joint 262 including a tubular portion 264 and a weld portion 266 to be welded to a fuel tank 246 is made of a resin alloy material obtained by alloying EVOH with a modified HDPE (not with HDPE), or a resin alloy material obtained by alloying EVOH with the modified HDPE and HDPE. The modified HDPE is obtained by introducing a functional group of high affinity for a hydroxyl group of EVOH into HDPE.

EVOH has been known as a material having excellent gas-barrier property or fuel-barrier property since a long time ago. The resin alloy material obtained by alloying such EVOH with the above-mentioned modified HDPE (not with HDPE) or the resin alloy material obtained by alloying such EVOH with the above-mentioned modified HDPE and HDPE has excellent weldability to the fuel tank 246 derived from HDPE or the modified HDPE contained herein, and also has very excellent fuel impermeability (gas-barrier property) derived from EVOH. Therefore, in the construction as shown in FIG. 21, the tubular portion 264 and the weld portion 266 can be provided with good fuel impermeability, and at the same time, the weld portion 266 can be expected to have high weldability to the fuel tank 246. Further, in the weld joint 262, because the entire weld joint 262 including the tubular portion 264 and the weld portion 266 is made of the same single material, the number of the steps required for production or formation can be reduced and thereby the cost for the weld joint 262 can be reduced. Further, similarly to EVOH, PA is also a material having excellent gas-barrier property or fuel-barrier property. So, the weld joint 262 may be made of a resin alloy material obtained by alloying PA with a modified HDPE (not with HDPE), or a resin alloy material obtained by alloying PA with the modified HDPE and HDPE. The modified HDPE is obtained by introducing a functional group of high affinity for an amine group of PA into HDPE. A similar advantage can be expected also for this alloy material.

However, as a result of a test for weld performance of such a weld joint 262 to the fuel tank 246, it is found that weld strength of the weld joint 262 to the fuel tank 246 actually varies, depending on various welding conditions, for example, such as fusing temperature, fusing time, fusion margin (fused thickness) of a resin of the weld joint 262 or the fuel tank 246, weld pressure, or weld time during welding operation, as a result, sufficient weld strength cannot always be obtained consistently.

In the weld joint 262 made of the above resin alloy material shown in FIG. 21, the weld portion 266 has higher weldability compared to a weld joint made solely of EVOH, but does not have so high weldability as a weld portion made of HDPE resin has. Due to this reason, when the weld joint 262 is welded to the resin fuel tank 246 at the weld portion 266, the weld portion 266 is not welded sometimes sufficiently. That is, there exist variations in welding result, such as excessive welding strength or insufficient welding strength, depending on welding conditions during welding operation. Similar problems are assumed also when fuel impermeable resins other than EVOH or PA are used in a weld joint.

[Patent Document 1] JP-A-2002-254938
[Patent Document 2] JP-A-2006-143172

Under the circumstances described above, it is an object of the present invention to provide a weld joint capable of being bonded to a resin fuel tank with consistent and sufficient welding strength, in the case at least a weld portion of the weld joint is made of a resin alloy material obtained by alloying a barrier resin of fuel impermeability such as EVOH or PA with modified HDPE, or with the modified HDPE and HDPE.

SUMMARY OF THE INVENTION

According to the present invention, there is provided a novel weld joint for being mounted integrally to a resin fuel tank by heat-welding. The weld joint comprises a tubular portion for connection to a tube or a connector in piping, and a weld portion at a base end portion of the weld joint for being welded and bonded to a rim portion around an opening of the resin fuel tank. The weld portion is made of a resin alloy material that is obtained by alloying a barrier resin (barrier resin material) of fuel impermeability solely with modified HDPE having affinity for the barrier resin (not with HDPE). The resin alloy material may be obtained by alloying the barrier resin with the modified HDPE and HDPE. The weld portion has a highly-weldable layer on an extremity portion of the weld portion facing the resin fuel tank. The highly-weldable layer is made of HDPE and/or modified HDPE having good weldability to the resin fuel tank. An extremity end surface of the highly-weldable layer serves as a weld surface for welding the weld portion to the resin fuel tank.

According to one aspect of the present invention, the weld portion is made of a resin alloy material that is obtained by alloying EVOH with modified HDPE obtained by introducing a functional group having high affinity for hydroxyl group of EVOH into HDPE (not with HDPE), or with the modified HDPE and HDPE. Also, the weld portion may be made of a resin alloy material that is obtained by alloying PA with modified HDPE obtained by introducing a functional group having high affinity for amine group of PA into HDPE (not with HDPE), or with the modified HDPE and HDPE. And, the weld portion has the highly-weldable layer in the extremity portion of the weld portion.

The extremity portion of the weld portion may be formed entirely from the highly-weldable layer. For example, the extremity portion may be made entirely of HDPE and/or modified HDPE. In this case, for example, only the extremity end surface of the highly-weldable layer serves as a weld surface. And, an outer peripheral surface of the highly-weldable layer may define a tapered surface that gradually reduces a diameter thereof in a direction away from the extremity end surface facing the resin fuel tank toward the tubular portion.

Also, the extremity portion of the weld portion may comprise the highly-weldable layer and a resin alloy portion made of the resin alloy material. In this case, an extremity end surface of the highly-weldable layer and the resin alloy portion serves as a weld surface, or the extremity end surface that is defined jointly by the highly-weldable layer and the resin alloy portion is welded to the resin fuel tank as a weld surface. In the extremity portion of the weld portion, an outer circumferential portion, an inner circumferential portion or a middle portion between outer and inner circumferential portions may be formed from the highly-weldable layer throughout an entire circumference of the extremity portion. For example, any one of the outer circumferential portion, the middle portion and the inner circumferential portion may be formed from the highly-weldable layer.

In one aspect of the present invention, the highly-weldable layer may be provided with bearing portions that are disposed radially. The bearing portions are formed so as to contact against a mold interior surface of a mold for forming the weld joint from the resin alloy material while the highly-weldable layer preformed is placed within the mold prior to injection of the resin alloy material into the mold. Then, deformation of the highly-weldable layer may be prevented by the bearing portions contacting against the mold-interior surface during injection of the resin alloy material into the mold.

In one aspect of the present invention, the outer circumferential portion of the extremity portion of the weld portion may be formed from the highly-weldable layer throughout an entire circumference of the outer circumferential portion, and the highly-weldable layer may be provided integrally with bearing portions disposed radially on an inner periphery of the highly-weldable layer. In this configuration, the bearing portions project to an inner periphery of the extremity portion of the weld portion. Or, the inner circumferential portion of the extremity portion of the weld portion may be formed from the highly-weldable layer throughout an entire circumference of the inner circumferential portion, and the highly-weldable layer may be provided integrally with bearing portions disposed radially on an outer periphery of the highly-weldable layer. In this configuration, the bearing portions project to an outer periphery of the extremity portion of the weld portion. Or, the middle portion of the extremity portion of the weld portion between outer and inner circumferential portions may be formed from the highly-weldable layer throughout an entire circumference of the middle portion, and the highly-weldable layer may be provided integrally with bearing portions disposed radially on an outer periphery and an inner periphery of the high-weldable layer, respectively. In this configuration, the bearing portions on the outer periphery of the highly-weldable layer project to an outer periphery of the extremity portion of the weld portion, and the bearing portions on the inner periphery thereof project to an inner periphery of the extremity portion of the weld portion.

In one aspect of the present invention, a whole of the tubular portion and the weld portion except for the highly-weldable layer may be made solely of the resin alloy material.

As stated above, according to the present invention, the extremity portion of the weld portion facing the resin fuel tank is formed from the highly-weldable layer made of HDPE resin and/or modified HDPE resin that have good weldability to the resin fuel tank. For example, the extremity portion of the weld portion is formed entirely from the highly-weldable layer made of HDPE and/or modified HDPE that have good weldability to the resin fuel tank throughout an entire circumference of the extremity portion. Namely, the weld portion of the weld joint is bonded to the resin fuel tank by welding a portion formed from the highly-weldable layer to the resin fuel tank. Therefore, according to the present invention, the weld portion made of the above mentioned resin alloy material can be provided with enhanced weldability to the resin fuel tank. Thereby it is possible to weld and bond the weld joint to the fuel tank with sufficiently consistent and high welding strength, notwithstanding welding conditions in a welding operation.

On the other hand, according to the present invention, the highly-weldable layer may form a part of the extremity portion of the weld portion, namely the outer circumferential portion, the inner circumferential portion or the middle portion between outer and inner circumferential portions thereof throughout the entire circumference of the extremity portion. For example, the rest part of the extremity portion or the resin alloy portion is made of the resin ally material. Here, an extremity end surface defined jointly by both of the highly-weldable layer and the resin alloy portion serves as a weld surface for welding the weld portion to the resin fuel tank. In this configuration, thanks to function of the highly-weldable layer, the weld portion of the weld joint also can be welded and bonded to the resin fuel tank with consistent and high welding strength. And, since an extremity end surface of the resin alloy portion of the weld portion, namely a part of the extremity portion made of the resin alloy material also serves as a weld surface for being welded to the resin fuel tank throughout the entire circumference of the resin alloy portion, the fuel gas in the fuel tank can be favorably restrained from permeating outside the fuel tank through the highly-weldable layer.

In a process for formation of the weld joint, the highly-weldable layer is preformed, the preformed highly-weldable layer is placed within a mold, then the resin alloy material is injected in the mold. In this process, the highly-weldable layer that has been placed in the mold could partly turn upward under pressure exerted by the resin alloy material injected into the mold, resulting that the highly-weldable layer cannot be molded at a correct position in the weld portion as predetermined in a two-shot molding operation or a two-color molding operation.

As a measure against that, an outer peripheral surface of the highly-weldable layer is designed tapered so as to gradually reduce its diameter in a direction away from the extremity end surface of the extremity portion facing the resin fuel tank toward the tubular portion of the weld joint. This configuration prevents the highly-weldable layer from partly turning upward as described above during the injection process of the resin alloy material.

Therefore, this configuration allows to favorably mold the weld portion or the weld joint integrally including the highly-weldable layer at the targeted position in the two-shot molding process.

When the highly-weldable layer forms a part of the extremity portion of the weld portion, bearing portions may be provided radially on the highly-weldable layer prior to molding the weld portion or injection of the resin alloy material into the mold. The bearing portions prevent the highly-weldable layer from being deformed or displaced by contacting against a mold-interior surface of the mold during injecting the resin alloy material into the mold while the highly-weldable layer is set in the mold. In this case, the highly-weldable layer can be favorably unified or integrated with the weld portion in the two-shot molding operation. When the highly-weldable layer is configured so as to be provided beforehand with the bearing portions to contact against the mold-interior surface of the mold, leading ends of the bearing portions on an outer periphery of the highly-weldable layer project to an outer periphery of the extremity portion of the weld portion or leading ends of the bearing portions on an inner periphery of the highly-weldable layer project to an inner periphery of the extremity portion of the weld portion, in an extremity portion of the weld portion of the molded weld joint.

In the present invention, a whole of the tubular portion and the weld portion except for the highly-weldable layer may be made solely of the above mentioned resin alloy material or made of a single material of the resin alloy material. This allows to make a whole of the weld joint substantially of the single resin material, the number of the steps required for production or formation of the weld joint can be reduced and accordingly the cost for the weld joint can be reduced.

Now, the preferred embodiments of the present invention will be described in detail with reference to the drawings.

BRIEF DESCRIPTION OF THE DRAWINGS

FIG. 1 is a view showing a weld joint of one embodiment of the present invention that is welded to a resin fuel tank.

DETAILED DESCRIPTION OF THE PREFERRED EMBODIMENTS

Figure 2A:
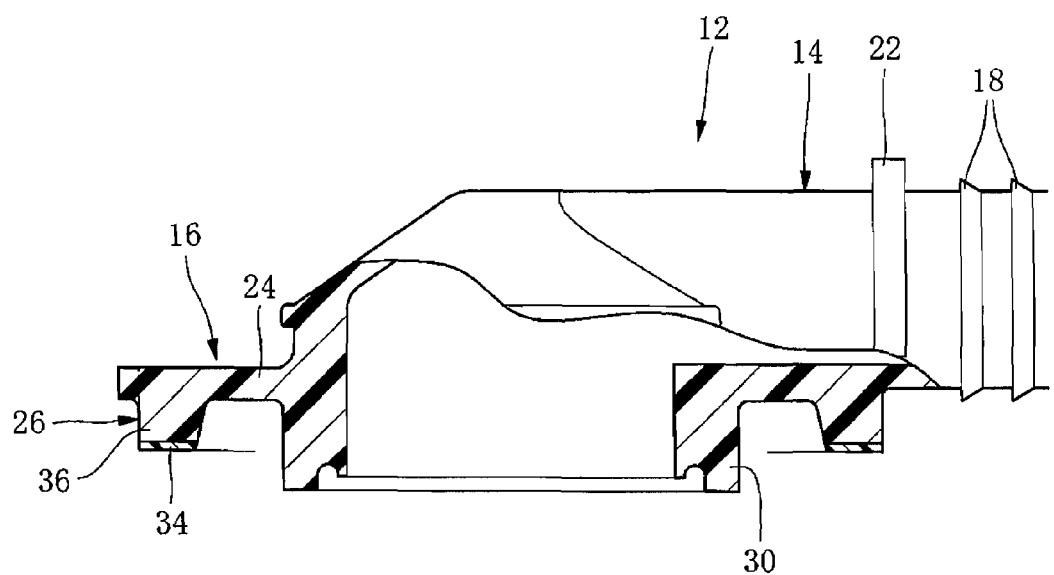
FIG. 2A is a view of the weld joint of FIG. 1 before welded to the resin fuel tank.

In FIG. 1, reference numeral 10 indicates a resin fuel tank having a multilayer construction that includes outer and inner layers 10-1, 10-3 made of HDPE resin and a gas-barrier layer 10-2 sandwiched between the outer layer 10-1 and the inner layer 10-3. The gas-barrier layer 10-2 is made of EVOH resin having excellent fuel impermeability.

Reference numeral 12 indicates a weld joint made of resin. The weld joint 12 has a tubular portion 14 serving a connecting portion to a piping tube (hereinafter referred to simply as a tube) and a weld portion 16 at a base end portion of the weld joint 12.

The tube is relatively press-fitted on the tubular portion 14 and connected to the fuel tank 10 via this weld joint 12.

The tubular portion 14 has a stop portion 19 that is provided with a plurality of annular projecting portions 18 axially spaced and has a saw-toothed cross-section on its outer peripheral surface.

The stop portion 19 serves to provide a stop for preventing withdrawal of the tube by wedging each of the annular projecting portions 18 with acute angled peaks in an inner surface of the tube.

The tubular portion 14 also has an annular O-ring groove 20 in a leading end thereof. An elastic O-ring serving as a sealing member is to be fitted in the O-ring groove 20.

The tubular portion 14 further has a stopper portion 22 of a generally annular shape on the left with respect to the stop portion 19 in the Figure (FIG. 1).

The stopper portion 22 serves to limit an inserted length of the tubular portion 14 with respect to the tube by contacting with a leading end of the tube when the tube is fitted on the tubular portion 14.

The weld portion 16 has a generally disk-shaped flange portion 24, and a downwardly extending portion 26 of an annular shape around an opening 28 of the fuel tank 10. The downwardly extending portion 26 extends downwardly from an outer peripheral end of the flange portion 24 toward the fuel tank 10. The weld joint 12 is integrally assembled or mounted to the fuel tank 10 by bonding the downwardly extending portion 26 to a rim portion around the opening 28 of the fuel tank 10, specifically to the outer layer 10-1 thereof through application of heat-welding.

The weld joint 12 is further provided integrally with a circular ring shaped protruding portion 30 protruding toward the fuel tank 10 inside the downwardly extending portion 26. Here, the protruding portion 30 is adapted for connection to a resin housing 32 for a valve or the like that is arranged in the fuel tank 10.

FIGS. 2A and 2B and FIGS. 3A and 3B show the shape of the weld joint 12 before being welded to the fuel tank 10.

Figure 2B:
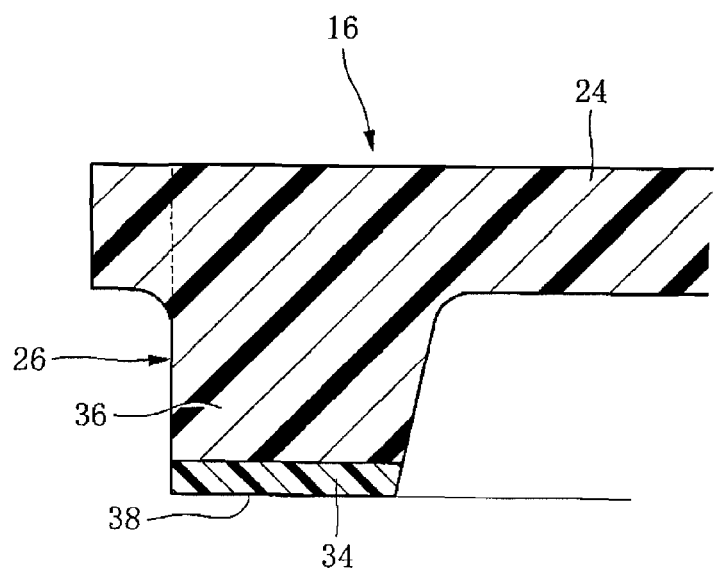
FIG. 2B is an enlarged view of a weld portion of the weld joint of FIG. 1.
Figure 3A:
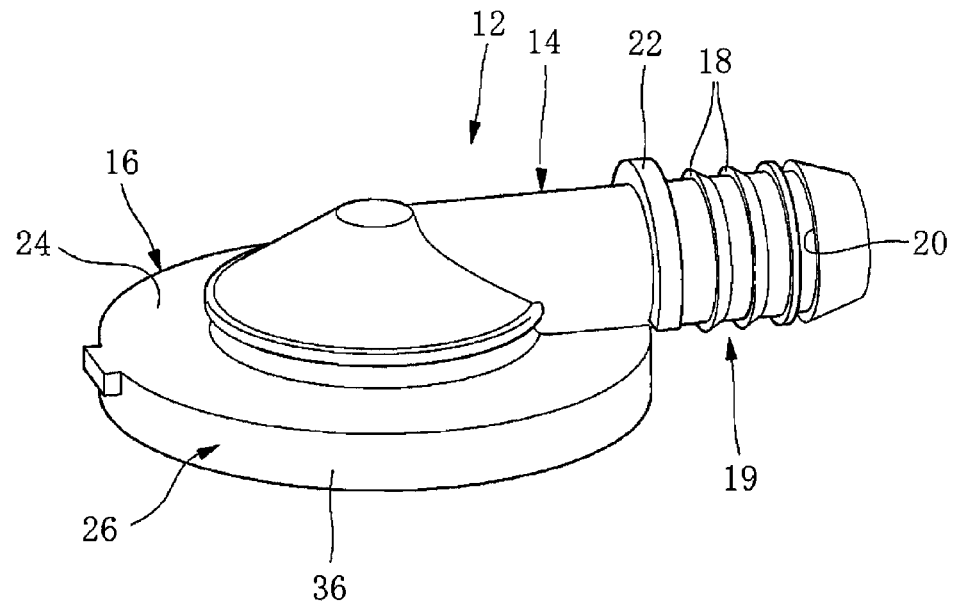
FIG. 3A is a perspective view of the weld joint of FIG. 1.
Figure 3B:
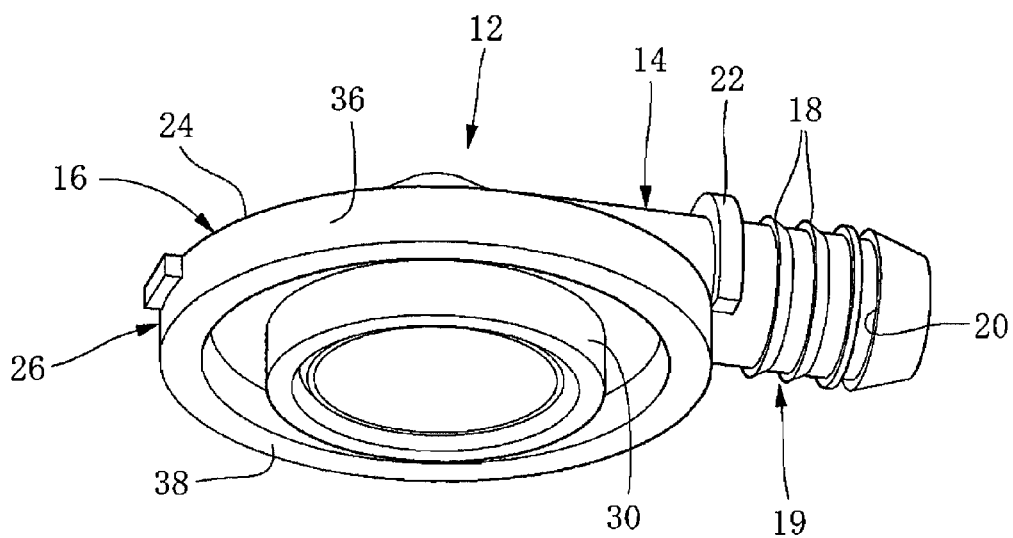
FIG. 3B is another perspective view of the weld joint of FIG. 1.

As shown in FIGS. 2A and 2B, in this embodiment, the weld portion 16, specifically, an extremity portion of the downwardly extending portion 26 facing the fuel tank 10 is formed entirely from a highly-weldable layer 34. The highly-weldable layer 34 has good weldability to the fuel tank 10. This highly-weldable layer 34 is formed and laminated integrally over the entire extremity end surface of a main portion 36 of the downwardly extending portion 26, throughout entire circumference around the opening 28, by two-shot molding technique.

In this embodiment, the highly-weldable layer 34 has a thickness of 2 mm (an allowance for welding or a welding margin is 2 mm).

The extremity end surface of the highly-weldable layer 34 serves as a weld surface 38 for bonding the weld portion 16 to the fuel tank 10 by heat-welding.

In this embodiment, the entire weld joint 12 except for this highly-weldable layer 34, specifically, the whole of the main portion 36 of the downwardly extending portion 26 and the flange portion 24 of the weld portion 16, and further the tubular portion 14 are made of a resin alloy material as follows. The resin alloy material is obtained by alloying ethylene-vinyl alcohol copolymer (EVOH) with modified high-density polyethylene (HDPE) obtained by introducing a functional group having high affinity for hydroxyl group of EVOH into HDPE or by alloying EVOH with the modified HDPE and typical HDPE. Alternatively, the resin alloy material is obtained by alloying polyamide (PA) with modified HDPE obtained by introducing a functional group having high affinity for amine group of PA into HDPE or by alloying PA with the modified HDPE and typical HDPE.

On the other hand, the highly-weldable layer 34 is made of a resin better than that resin alloy material in terms of weldability to the fuel tank 10. Specifically, the highly-weldable layer 34 is made of HDPE resin that has a better weldability to the outer layer 10-1 of the fuel tank 10.

Meanwhile, for the highly-weldable layer 34, the above-mentioned modified HDPE resin or modified HDPE resin or a blended material of typical HDPE resin and the modified HDPE resin or modified HDPE is used.

Here, as shown in FIG. 2B, in the highly-weldable layer 34, its lower and upper surfaces in the Figure, namely, the weld surface 38 facing the fuel tank 10 and a surface opposite to the weld surface 38 define surfaces parallel with an outer surface of the fuel tank 10, its outer peripheral surface is seen as an extension of an outer peripheral surface of the main portion 36 downwardly, specifically its outer peripheral surface defines a surface generally perpendicular to the outer surface of the fuel tank 10. And, in the highly-weldable layer 34, its inner peripheral surface is seen as an extension of an inner peripheral surface of the main portion 36 in a direction toward the fuel tank 10, specifically, here, its inner peripheral surface is slightly oblique relative to a vertical direction in the Figure.

The reason why modified HDPE is used instead of typical HDPE for the material to be alloyed with EVOH or PA in this embodiment is as follows.

Typical HDPE has low affinity for EVOH or PA. Therefore, when typical HDPE and EVOH or PA are just alloyed, large agglomerations of EVOH or PA (for example, EVOH or PA and HDPE) are produced due to their non-affinity. Therefore, EVOH or PA (for example, EVOH or PA and HDPE) does not present evenly or uniformly.

In this case, although EVOH or PA by itself is excellent in fuel impermeability, EVOH or PA takes forms of large agglomerations, these large agglomerations are separated each other in a matrix of HDPE (when the matrix is formed by HDPE). Consequently, a fuel gas easily passes out through these agglomerations of EVOH or PA.

EVOH or PA and HDPE are non compatible with each other. So, even when EVOH or PA and HDPE are physically mixed or blended, EVOH or PA and HDPE are separated from each other, thereby a phase boundary of low affinity is formed.

As a result, this mixed material (or blended material) is brought into a state where the mixed material includes the large agglomerations of EVOH or PA almost like foreign materials. Consequently, strength of the mixed material may become low (namely, the mixed material may be in a brittle condition). Also, phase separation may be readily caused at or along the phase boundary therebetween.

On the contrary, in this embodiment, for a material to be alloyed with EVOH, used is the modified HDPE resin that is obtained by introducing a functional group having chemical reactivity (mainly in terms of a hydrogen bond and a covalent bond) to a hydroxyl group of EVOH into HDPE, or alternatively, for a material to be alloyed with PA, used is the modified HDPE resin that is obtained by introducing a functional group having chemical reactivity (mainly in terms of a hydrogen bond and a covalent bond) to an amine group of PA into HDPE. Therefore, EVOH or PA and HDPE (or the modified HDPE) are mixed and dispersed evenly or uniformly, and both of the materials are well blended each other.

Thereby both of good weldability (namely, weldability to the fuel tank 10) and fuel impermeability (gas-barrier property) are realized.

The reason why EVOH or PA and HDPE or the modified HDPE are mixed and dispersed evenly or uniformly, and are fused to each other into a homogeneous phase is that HDPE is provided with high affinity for EVOH or PA as a result of being modified by introducing the functional group thereinto.

And, the resin alloy material of EVOH or PA and the modified HDPE has an enhanced impact resistance as well as an enhanced strength, since EVOH or PA and HDPE or the modified HDPE are mixed and dispersed evenly or uniformly to form the homogeneous phase.

Here, a modifying group, namely, the functional group to be introduced into HDPE may be, for example, a carboxylic acid group, a carboxylic acid anhydride, an epoxy group, an acrylate group, a methacrylate group, a vinyl acetate group, an amino group, or the like.

Welding strength may be enhanced by increasing a ratio of HDPE (or the modified HDPE) in the resin alloy material, while fuel impermeability may be enhanced by increasing a ratio of EVOH or PA in the resin alloy material. As such, a requirement for either of improved welding strength or improved fuel impermeability can be met by adjusting the ratio of HDPE (or the modified HDPE) or EVOH (or PA) in the resin alloy material. The volume ratio of EVOH/the modified HDPE (EVOH to the modified HDPE) or the volume ratio of PA/the modified HDPE (PA to the modified HDPE) may be set in a range from 80/20 to 15/85.

Meantime, since EVOH, PA and the modified HDPE have melt mass-flow rate (MFR) equal to or less than 10 g/10 minutes (JIS K7210), respectively, the resin alloy material is provided with good liquidity and excellent molding properties for formation or molding of the weld joint 12.

The above blend does not require to contain a compatibilizer or compatibilizing material This is also a factor in enhancing the fuel impermeability. Incidentally, according to need, the compatibilizer, inorganic filler or the like may be blended in the resin alloy material. However, an excessive compatibilizer could deteriorate crystalline properties of a base material, resulting in increased fuel permeability (namely, gas-barrier property is lowered). Thus, an amount of the compatibilizer to be added should be decided to an extent capable of ensuring a required gas-barrier property.

Moreover, besides the resin alloy material obtained by alloying EVOH or PA solely with the modified HDPE, or by alloying EVOH or PA with the modified HDPE, not with HDPE, the resin alloy material may be obtained by alloying EVOH or PA with both of typical HDPE and the modified HDPE or modified HDPE.

Since typical HDPE also has melt mass-flow rate (MFR) equal to or less than 10 g/10 minutes (JIS K7210), the resin alloy material including typical HDPE is also provided with good liquidity and excellent molding properties for formation or molding of the weld joint 12.

In this embodiment, the above resin alloy material may have a sea-island structure including one of EVOH or PA and modified HDPE as a sea component and the other of them as an island component.

FIGS. 4A to 4D show a procedure for welding the weld joint 12 as shown in FIGS. 2A and 2B and FIGS. 3A and 3B to the fuel tank 10.

Figure 4A:
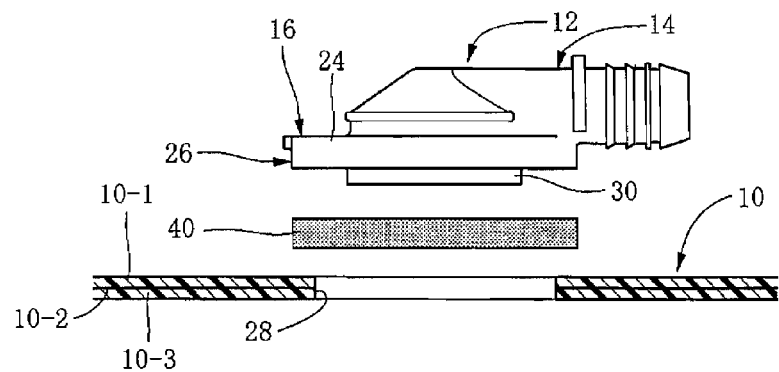
FIGS. 4A to 4D are view showing a process for mounting of the weld joint of FIG. 1 to the fuel tank by heat-welding.
Figure 4B:
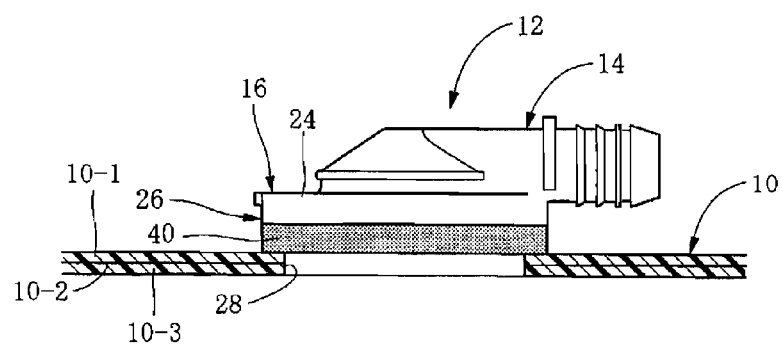

The procedure for mounting the weld joint 12, which is formed separated from the fuel tank 10, integrally to the fuel tank 10 by heat-welding is as follows. As shown in FIGS. 4A and 4B, a heat plate 40 is sandwiched between the weld joint 12 and the fuel tank 10 to melt or fuse the extremity end surface of the downwardly extending portion 26 of the weld joint 12, here, specifically the weld surface 38 of the highly-weldable layer 34, and a welded surface of the outer layer 10-1 of the fuel tank 10 by heat.

Figure 4C:
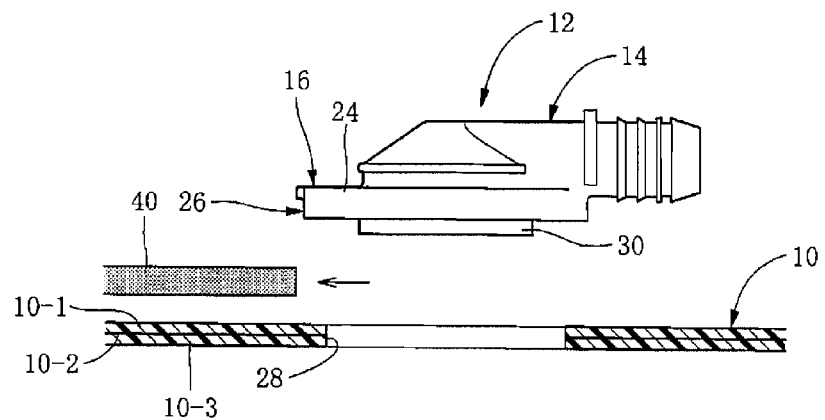
Figure 4D:
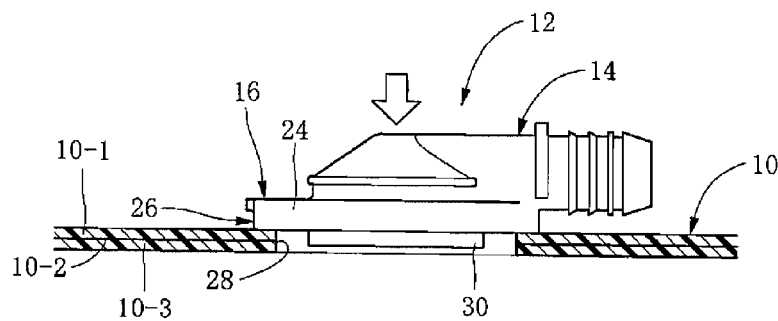

Then, as shown in FIG. 4C, the heat plate 40 is removed, the weld surface 38 of the weld joint 12 is laid on the fuel tank 10, a force is exerted on the weld joint 12 downwardly in the Figure to weld the weld joint 12 integrally to the fuel tank 10 by heat (FIG. 4D).

Figure 5:
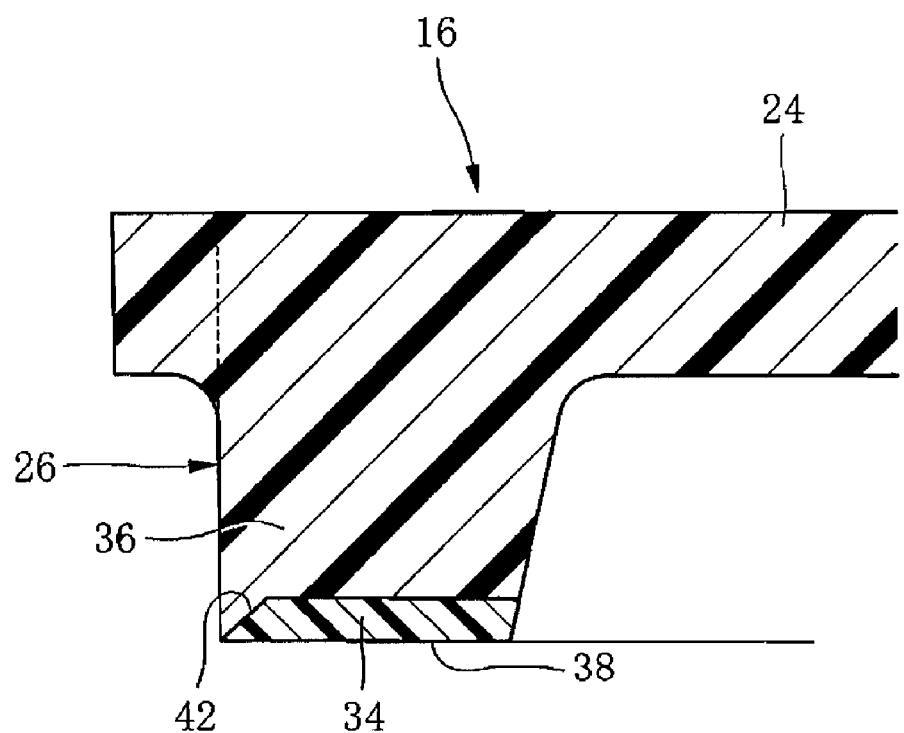
FIG. 5 is an enlarged view of a weld portion of another embodiment of the present invention.

FIG. 5 shows another (second) embodiment of the present invention.

Specifically, a highly-weldable layer 34 here has a different shape from that of the above embodiment (the first embodiment).

More specifically, in the second embodiment, an outer peripheral surface of the highly-weldable layer 34 defines a tapered surface 42 that gradually reduces a diameter thereof in an upward direction in the Figure from an extremity end surface of the highly-weldable layer 34 facing the resin fuel tank 10, namely, in a direction away from the extremity end surface thereof toward the tubular portion 14. Other portions are the same in shape as those of the first embodiment.

FIGS. 6A and 6B, FIGS. 7A and 7B and FIG. 8 show effects imparted by a design of the highly-weldable layer 34 shown in FIG. 5, along with a method for forming the weld joint 12.

In these Figures, reference numeral 44 indicates a mold for the weld joint 12, reference numeral 46 indicates a mold cavity of the mold 44, and reference numeral 48 indicates a mold cavity part for molding the downwardly extending portion 26 of the weld portion 16.

And, reference numeral 48-1 indicates a mold-interior surface for an outer peripheral surface of the downwardly extending portion 26, reference numeral 48-2 indicates a mold-interior surface for an inner peripheral surface of the downwardly extending portion 26, and reference numeral 48-3 indicates a mold-interior surface for a extremity end surface of the downwardly extending portion 26 or the highly-weldable layer 34, namely the weld surface 38 of the downwardly extending portion 26, respectively.

Figure 6A:
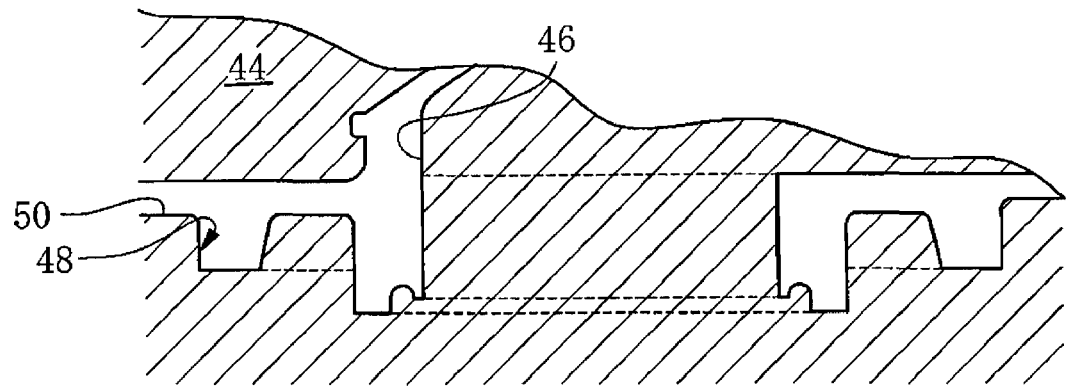
FIG. 6A is a view showing a mold for the weld joint of FIG. 1.
Figure 6B:
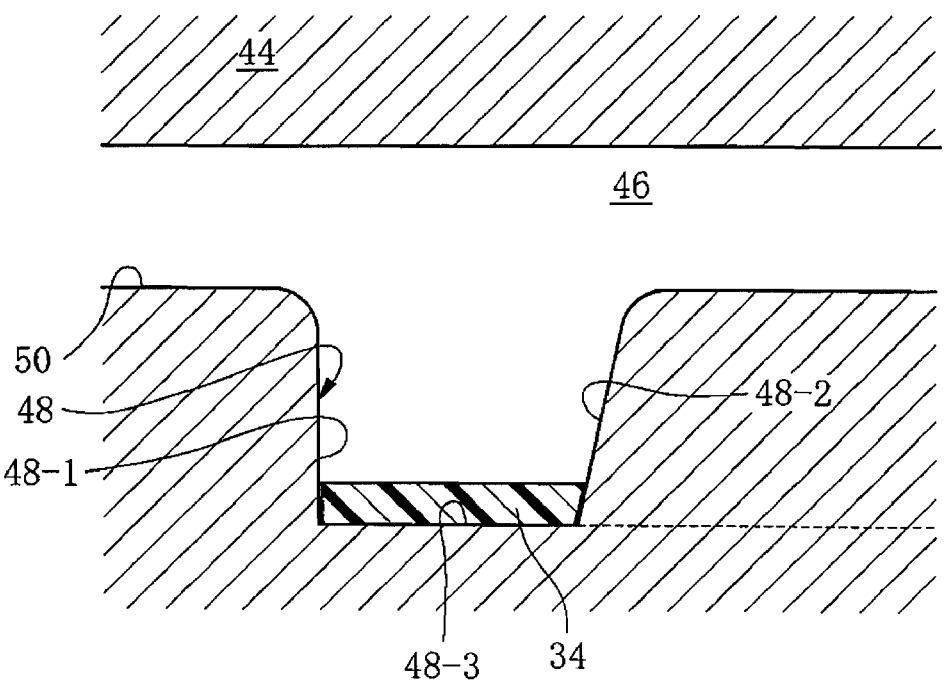
FIG. 6B is an enlarged view showing a part of the mold of FIG. 6A.

FIG. 6B shows the case of forming the weld joint 12 shown in FIGS. 2A and 2B. Here, first, the highly-weldable layer 34 that takes a form of a ring-shaped board as a whole, is preformed. Then, the highly-weldable layer 34 is placed within the mold cavity 46, specifically in the mold cavity part 48 for the downwardly extending portion 26. At that time, the highly-weldable layer 34 is placed such that its outer peripheral surface, inner peripheral surface and lower surface in FIGS. 6A and 6B, namely the lower surface defining the weld surface 38 contact the mold-interior surfaces 48-1, 48-2 and 48-3, respectively.

However, the preformed highly-weldable layer 34 should be sized slightly smaller than a location of the mold cavity part 48 for the highly-weldable layer 34 in length from left to right in FIGS. 6A and 6B to enable to insert and place the highly-weldable portion 34 in the mold cavity part 48 without fail.

So, strictly speaking, when the highly-weldable layer 34 is inserted and set in the mold cavity part 48, a slight clearance is created between the outer peripheral surface of the highly-weldable layer 34 and the mold-interior surface 48-1.

Subsequently, the resin alloy material for the weld joint 12 is injected via a laterally oriented inlet 50 in a right-hand direction in FIGS. 6A and 6B to fill the mold cavity 46 with the resin alloy material, whereby the highly-weldable layer 34 and other portion than the highly-weldable layer 34 are integrally molded in a two-shot molding or a second shot operation of the two-shot molding.

Figure 7A:
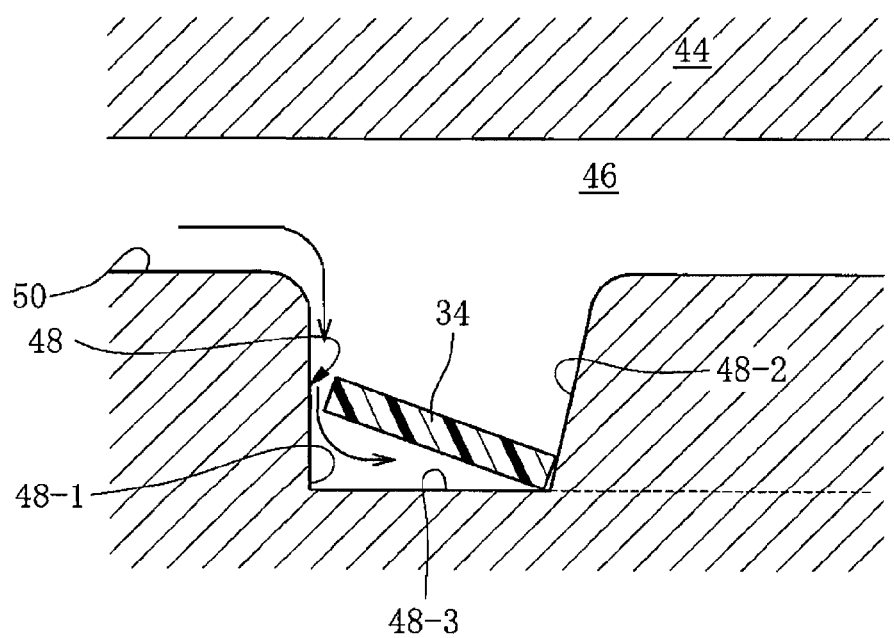
FIG. 7A is a view for explaining a problem encountered in formation of the weld portion of FIG. 1.

During that process, in the highly-weldable layer 34 having a shape as shown in FIG. 2B, the highly-weldable layer 34 could partly turn upward under pressure exerted by the resin alloy material that has been injected vie the inlet 50, as shown in FIG. 7A.

If this phenomenon occurs, consequently, the highly-weldable layer 34 cannot be molded in a correct position predetermined as shown in FIG. 2B.

Figure 7B:
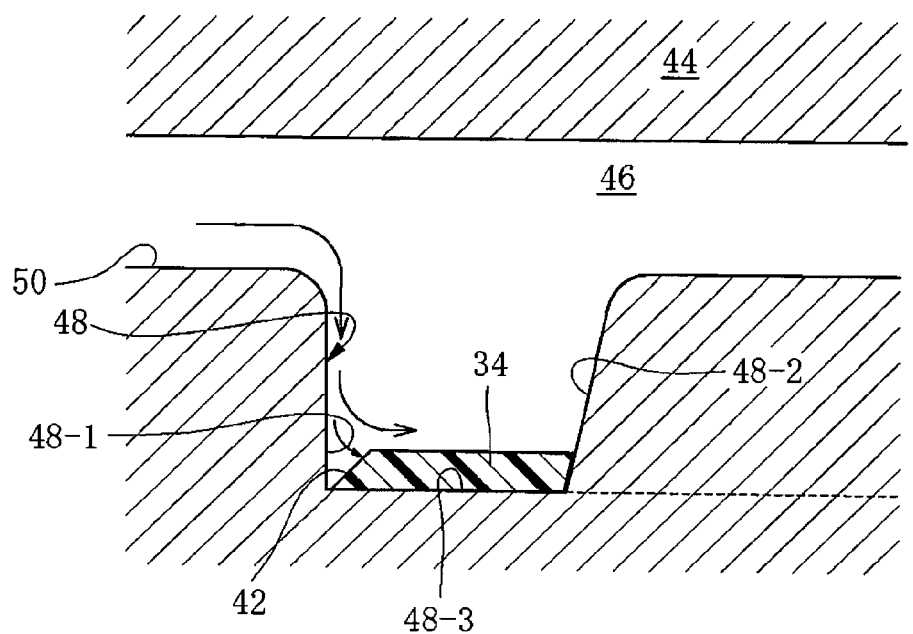
FIG. 7B is a view for explaining a solution of the problem of FIG. 7A.

On the contrary, in the highly-weldable layer 34 having a shape as shown in FIG. 5, its outer peripheral surface defines the tapered surface 42. Therefore, when the resin alloy material is injected via the inlet 50 in the mold cavity 48 where the highly-weldable layer 34 has been placed, the above-mentioned phenomenon does not occur as shown in FIG. 7B. Namely, since the tapered surface 42 is pushed downwardly by the pressure exerted by the injected resin alloy material, the pre-set highly-weldable layer 34 in the mold cavity part 48 does not partly turn upward as shown in FIG. 7A and is allowed to remain in close contact with the mold-interior surface 48-3.

In this state, the rest part of the weld joint 12 is molded from the resin alloy material and consequently the highly-weldable layer 34 is integrated with the rest part in a two-shot molding.

So, when the highly-weldable layer 34 is formed into the shape as shown in FIG. 5, the weld joint 12 can be molded by two-shot molding so as to include the highly-weldable layer 34 of predetermined shape at the predetermined position and in the correct orientation.

According to the embodiment as stated above, the weld portion 16 formed from the resin alloy material can be provided with much higher weldability, thereby the weld joint 12 can be welded to the fuel tank 10 with sufficiently consistent and strong welding strength under any conditions of welding.

Figure 8:
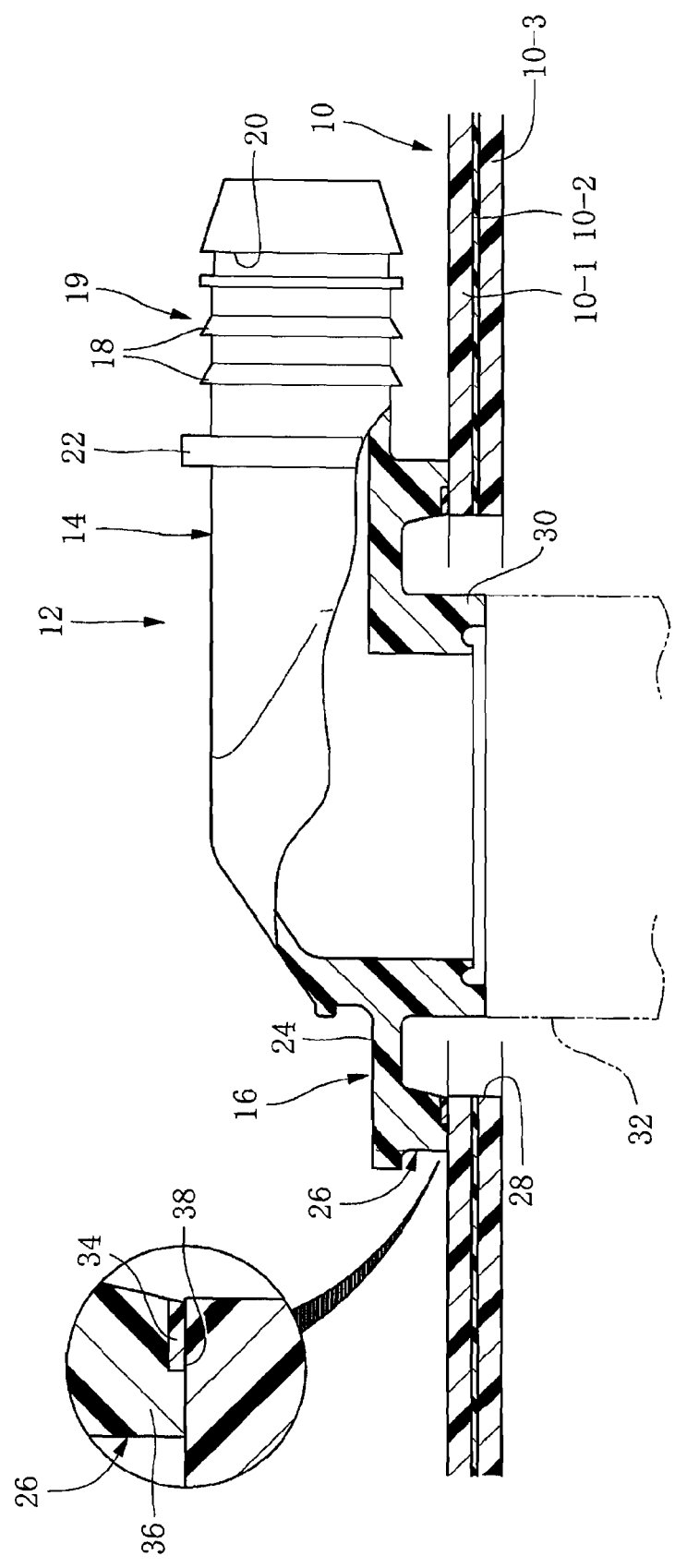
FIG. 8 is a view showing a weld joint of yet another embodiment of the present invention that is welded to the resin fuel tank.
Figure 9A:
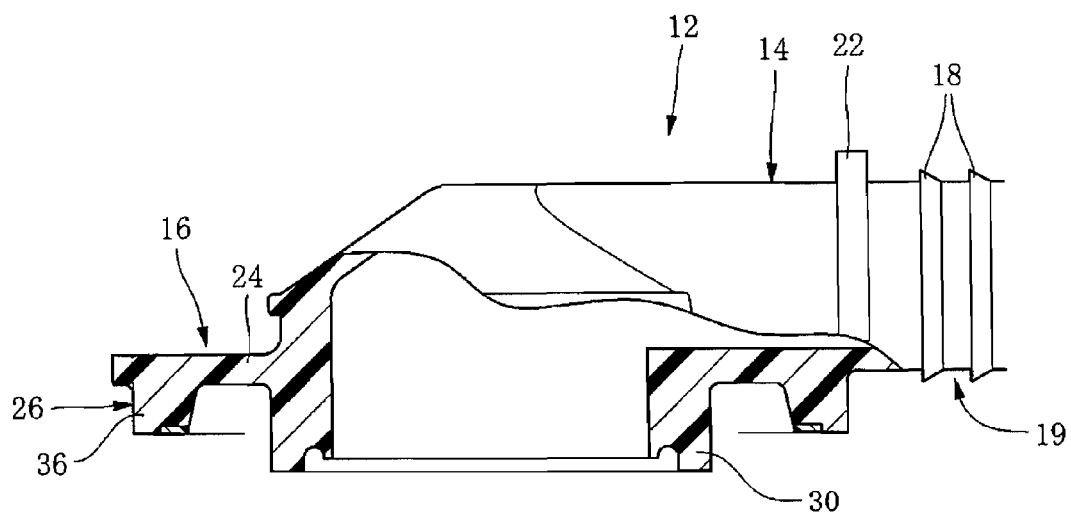
FIG. 9A is a view of the weld joint of FIG. 8 before welded to the resin fuel tank.
Figure 9B:
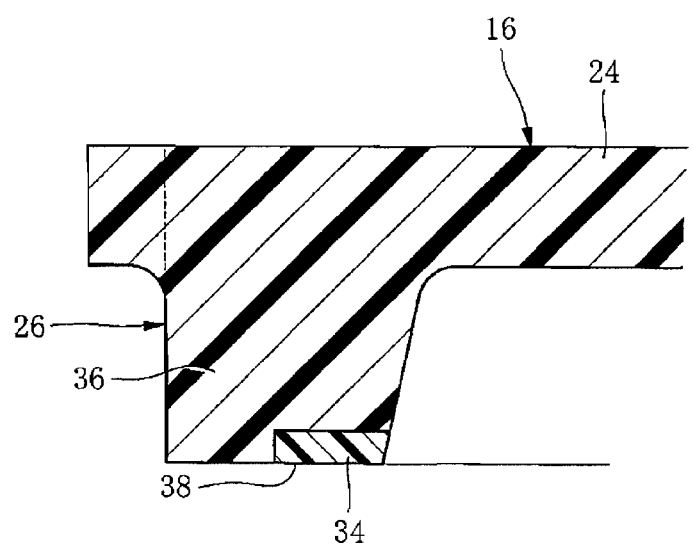
FIG. 9B is an enlarged view of a weld portion of the weld joint of FIG. 8.

FIG. 8 and FIGS. 9A and 9B show yet another embodiment (the third embodiment) of the present invention.

As shown in FIGS. 9A and 9B, in this embodiment, only an inner circumferential portion of the extremity portion of the downwardly extending portion 26 facing the fuel tank 10, or a generally radially inner half of the extremity portion thereof facing the fuel tank 10 is formed from the highly-weldable layer 34 that is made from the same resin material as in the above embodiments.

In the third embodiment, the weld surface 38 of the extremity portion of the downwardly extending portion 26 is defined by the highly-weldable layer 34 of a radially inward portion of the extremity portion and the main portion 36 of the resin alloy material of a radially outward portion of the extremity portion. Therefore, the weld joint 12 is welded to the fuel tank 10 in such manner that an extremity end surface of the highly-weldable layer 34 and an extremity end surface of the main portion 36 are welded as the weld surface 38 to the fuel tank 10.

Thanks to function of the highly-weldable layer 34, a welding strength of the weld joint 12 to the fuel tank 10 can be increased also in this configuration, compared to the weld joint 12 made solely of the resin alloy material.

And, in the outer circumferential portion, the resin alloy material that is welded to the fuel tank 10 forms a wall or barrier impermeable to a fuel gas. Thus, in this embodiment, the extremity portion of the downwardly extending portion 26 can have more enhanced fuel impermeability compared to those shown in FIGS. 2A and 2B and FIG. 5.

The outer circumferential portion of the extremity portion of the downwardly extending portion 26 is made of the resin alloy material having more excellent fuel-impermeability compared to the inner circumferential portion formed from the highly-weldable layer 34. So, even if a fuel gas passes through the highly-weldable layer 34 to an outer peripheral side thereof, the fuel gas is prevented from permeating out by the outer circumferential portion. The fuel gas in the fuel tank 10 can be effectively restrained from leaking outside the fuel tank 10 through the extremity portion.

Figure 10A:
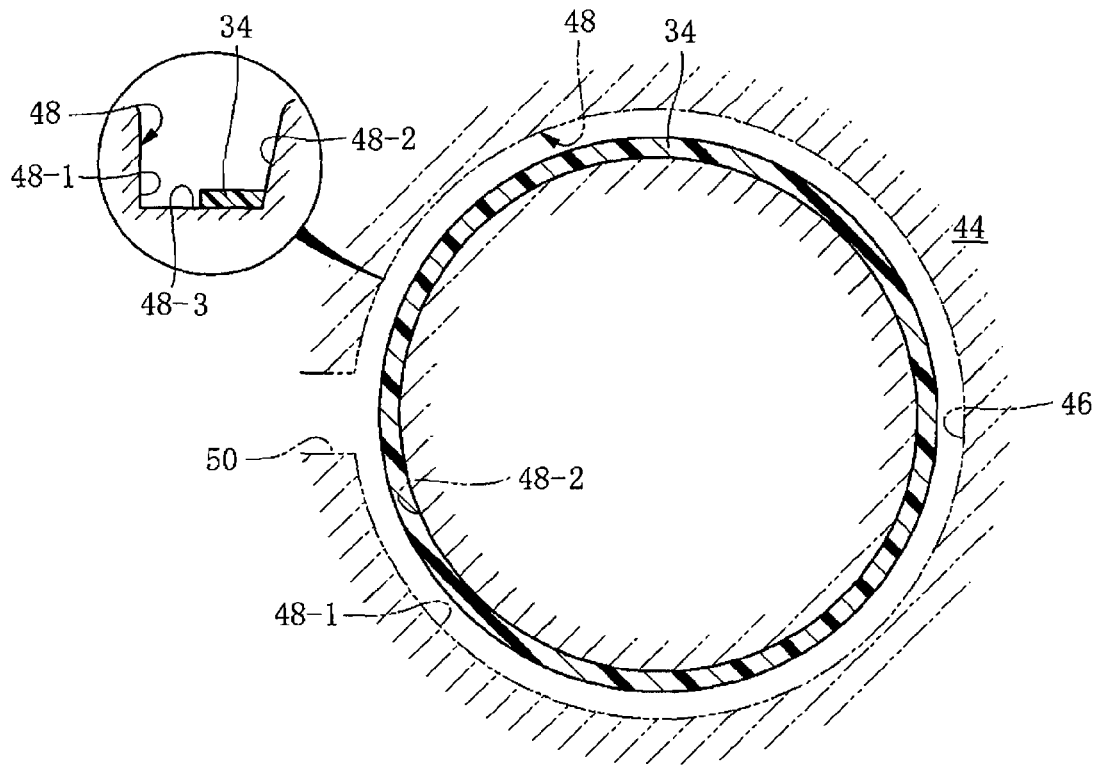
FIGS. 10A and 10B are views for explaining a problem encountered in formation of the weld portion of FIG. 8.
Figure 10B:
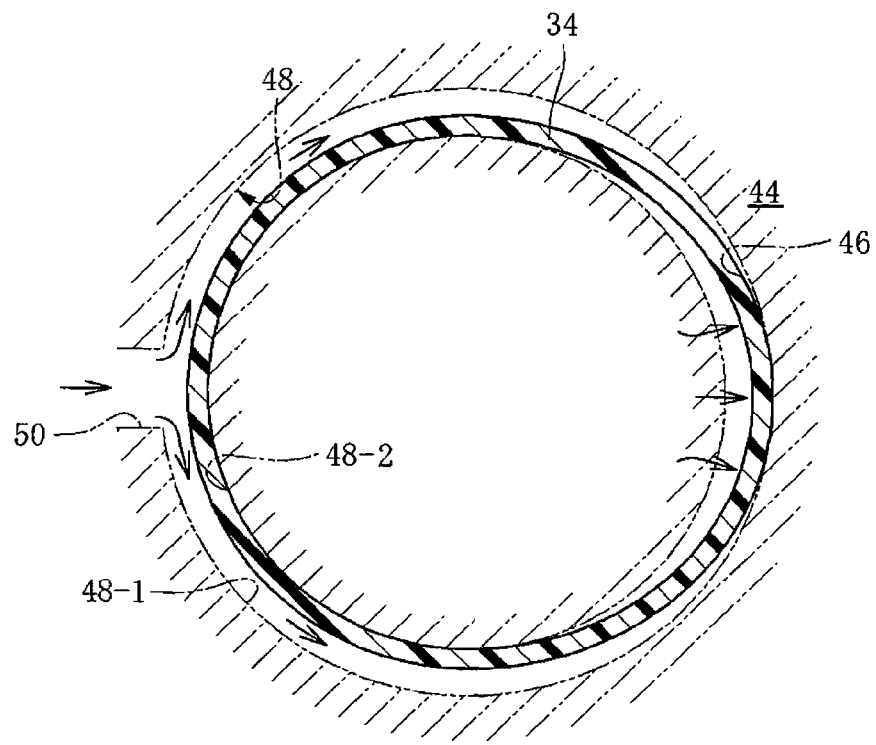

FIGS. 10A and 10B show a state that a preformed highly-weldable layer 34 shown in FIG. 9B is placed or set as an insert in the mold cavity part 48.

In this state, the resin alloy material is injected via the inlet 50 in a right direction in FIGS. 10A and 10B for forming the weld portion 16 (namely, the entire weld joint 12) from the resin alloy material. During this process, there is a following fear. The resin alloy material flows along the annular mold cavity part 48 from left to right in the Figure (FIG. 10B), and intrudes inside the ring-shaped highly-weldable layer 34 under an injection pressure. The resin alloy material further pushes and enlarges a right side portion of the highly-weldable layer 34 in the Figure (FIG. 10B) away from the mold-interior surface 48-2 under the injection pressure, the highly-weldable layer 34 is deformed while a part of the resin alloy material intrudes and stays between the highly-weldable layer 34 and the mold-interior surface 48-2, and the highly-weldable layer 34 in deformed state is integrated with the weld portion 16.

Figure 11A:
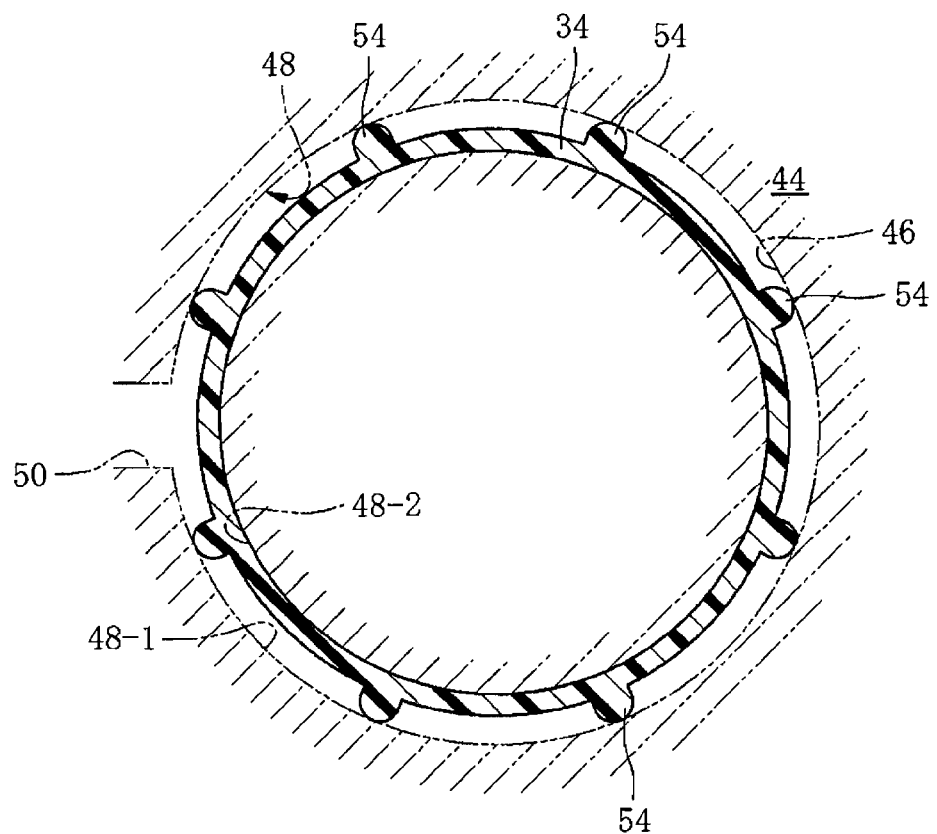
FIG. 11A is a view of a highly-weldable layer with bearing portions on an outer periphery thereof.
Figure 11B:
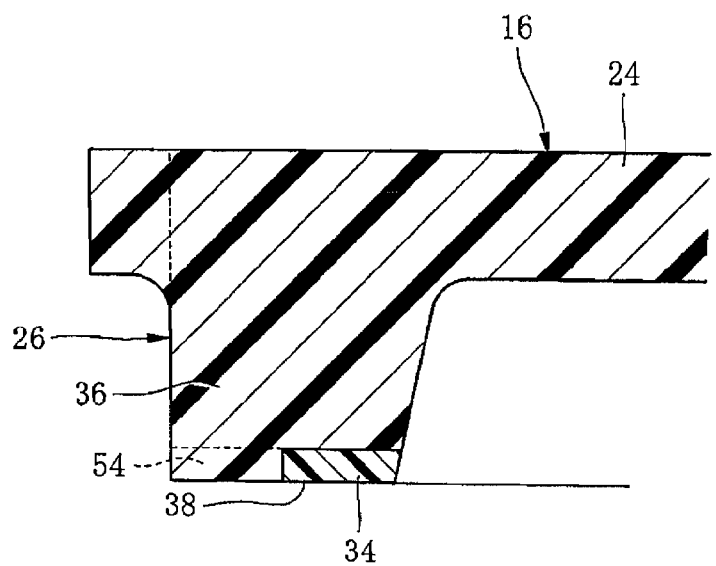
FIG. 11B is an enlarged view of a weld portion of FIG. 11A.

FIGS. 11A and 11B show a highly-weldable layer 34 having a shape for solving such problem.

As shown in the Figure, here, the ring-shaped highly-weldable layer 34 is provided with a plurality of bearing portions 54 on an outer periphery thereof that project radially and are disposed at certain or equal spaced intervals circumferentially along the ring-shaped highly-weldable layer 34. The bearing portions 54 contact against an outer mold-interior surface 48-1 for an outer periphery of the downwardly extending portion 26 while the highly-weldable layer 34 is placed in the mold cavity part 48.

By designing the highly-weldable layer 34 in such configuration, the highly-weldable layer 34 can be prevented from being deformed as shown in FIG. 10B by the injection pressure of the resin alloy material when the resin alloy material is injected via the inlet 50 in the mold cavity part 48. By using the highly-weldable layer 34 of the shape shown in FIGS. 11A and 11B, the highly-weldable layer 34 can be favorably integrated with the weld portion 16 at a targeted position. And, at the extremity portion of the weld portion 16 of the formed or molded weld joint 12, a leading end of each of the bearing portions 54 extends to an outer periphery of the extremity portion of the weld portion 16, or an outer peripheral surface of the extremity portion of the weld portion 16.

Figure 12:
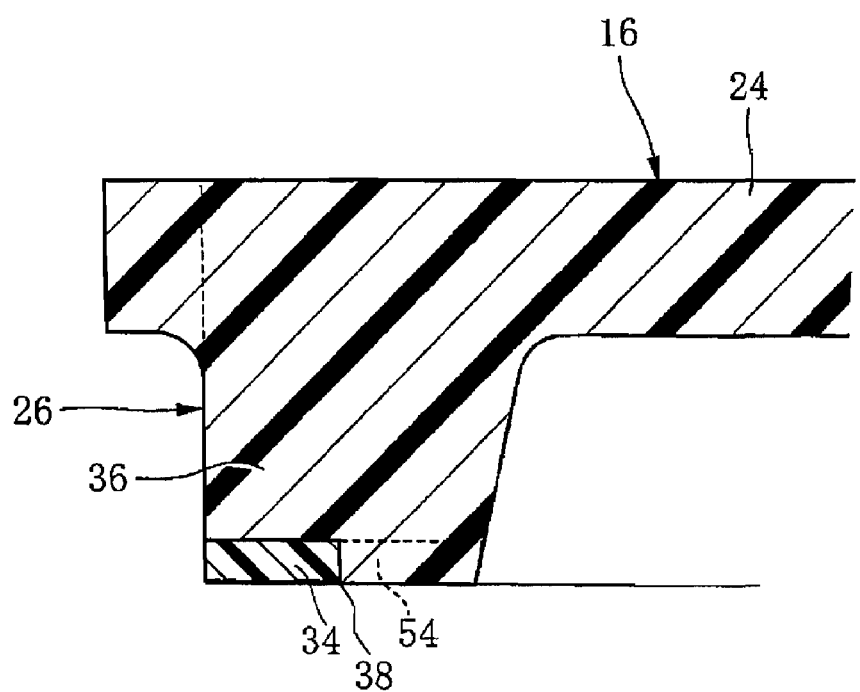
FIG. 12 is a view of a weld potion where an outer circumferential portion thereof is formed from a highly-weldable layer.
Figure 13:
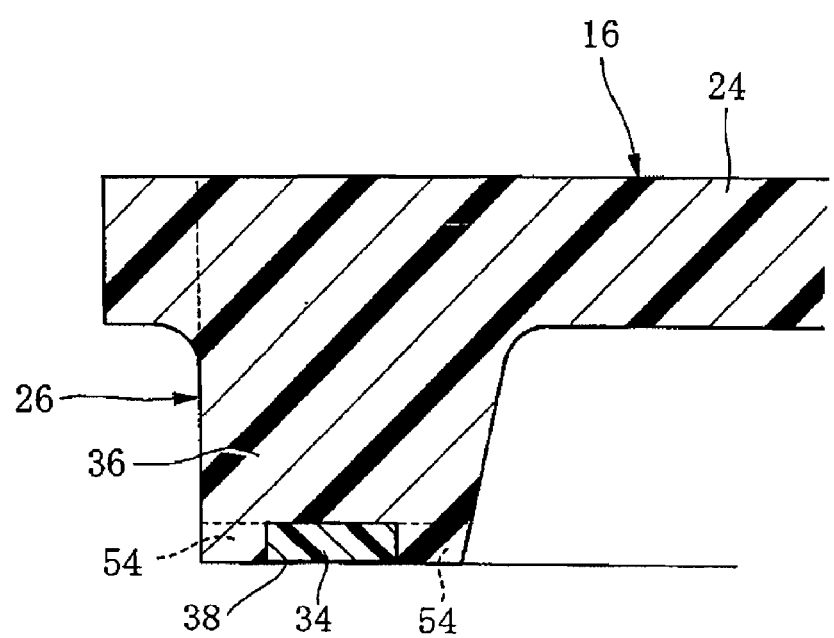
FIG. 13 is a view of a weld potion where a middle portion thereof between outer and inner circumferential portions is formed from a highly-weldable layer.

In the above embodiments, only a generally radially inner half of the extremity portion of the downwardly extending portion 26 facing the fuel tank 10 is formed from the highly-weldable layer 34. However, as the case may be, only a generally radially outer half of the extremity portion of the downwardly extending portion 26 may be formed from the highly-weldable layer 34 (refer to FIG. 12). Or, a middle portion of the extremity portion of the downwardly extending portion 26 between outer and inner circumferential portions may be formed from the highly-weldable layer 34 (refer to FIG. 13). These configurations can also produce the same effects as above.

Figure 14:
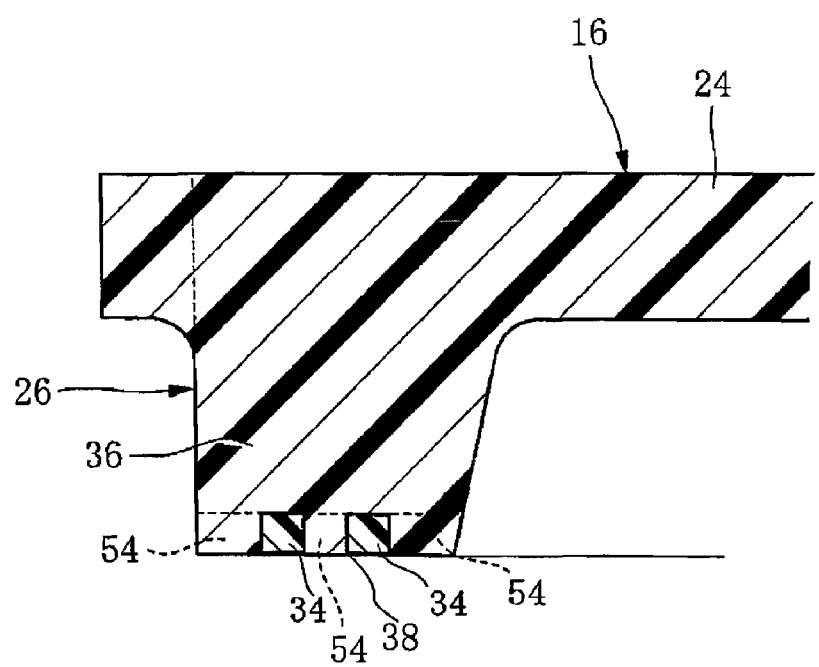
FIG. 14 is a view of a weld potion where a middle portion thereof between outer and inner circumferential portions is provided with two highly-weldable layers.

And, according to the circumstances, the ring-shaped highly-weldable layer 34 may be radially divided into two and may be arranged to the middle portion of the extremity portion, or two of the ring-shaped highly-weldable layers 34 may be arranged to the middle portion of the extremity portion (refer to FIG. 14).

Figure 15:
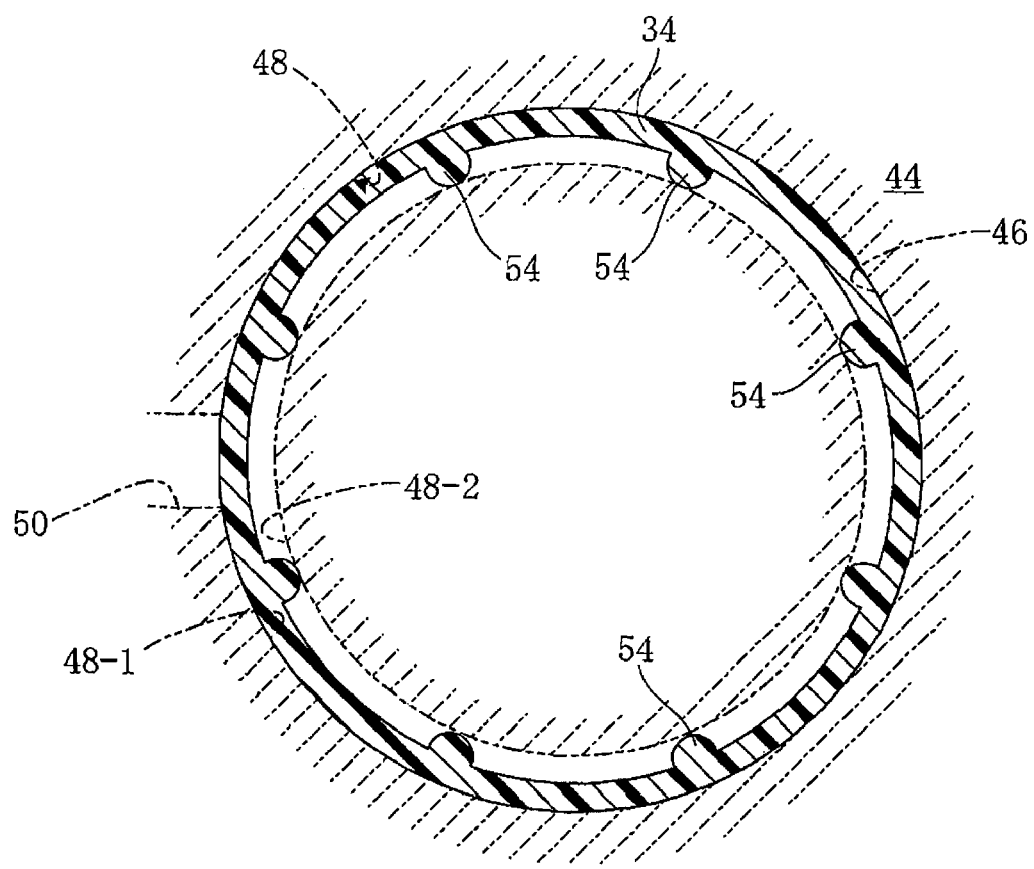
FIG. 15 is a view of a highly-weldable layer with bearing portions on an inner periphery thereof.

When the outer circumferential portion of the extremity portion of the downwardly extending portion 26 is formed from the highly-weldable layer 34, the bearing portions 54 are formed on an inner periphery thereof so as to project radially toward the inner mold-interior surface 48-2 and contact against the mold-interior surface 48-2 (refer to FIG. 15). In this case, in the extremity portion of the weld portion 16 of the formed or molded weld joint 12, a leading end of each of the bearing portions 54 reaches an inner periphery or an inner peripheral surface of the extremity portion of the weld portion 16.

Figure 16:
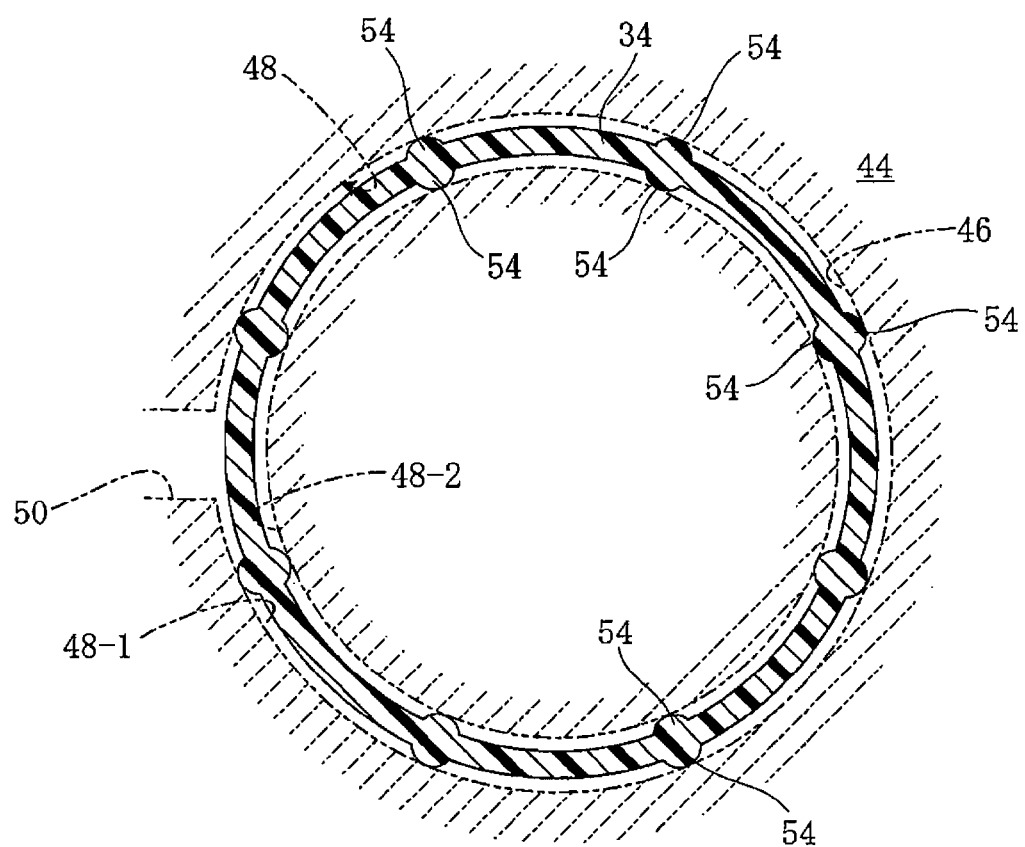
FIG. 16 is a view of a highly-weldable layer with bearing portions on outer and inner peripheries thereof.

When the middle portion of the extremity portion of the downwardly extending portion 26 between outer and inner circumferential portions is formed from the highly-weldable layer 34, the bearing portions 54 as above may be formed on both outer and inner peripheries of the highly-weldable layer 34 so as to project radially toward the mold-interior surfaces 48-1 and 48-2, respectively and contact against the mold-interior surfaces 48-1 and 48-2, respectively (refer to FIG. 16). In this case, in the extremity portion of the weld portion 16 of the formed or molded weld joint 12, a leading end of each of the bearing portions 54 on the inner periphery of the highly-weldable layer 34 reaches the inner periphery or the inner peripheral surface of the extremity portion of the weld portion 16, while a leading end of each of the bearing portions 54 on the outer periphery reaches the outer periphery or the outer peripheral surface of the extremity portion of the weld portion 16.

Figure 17:
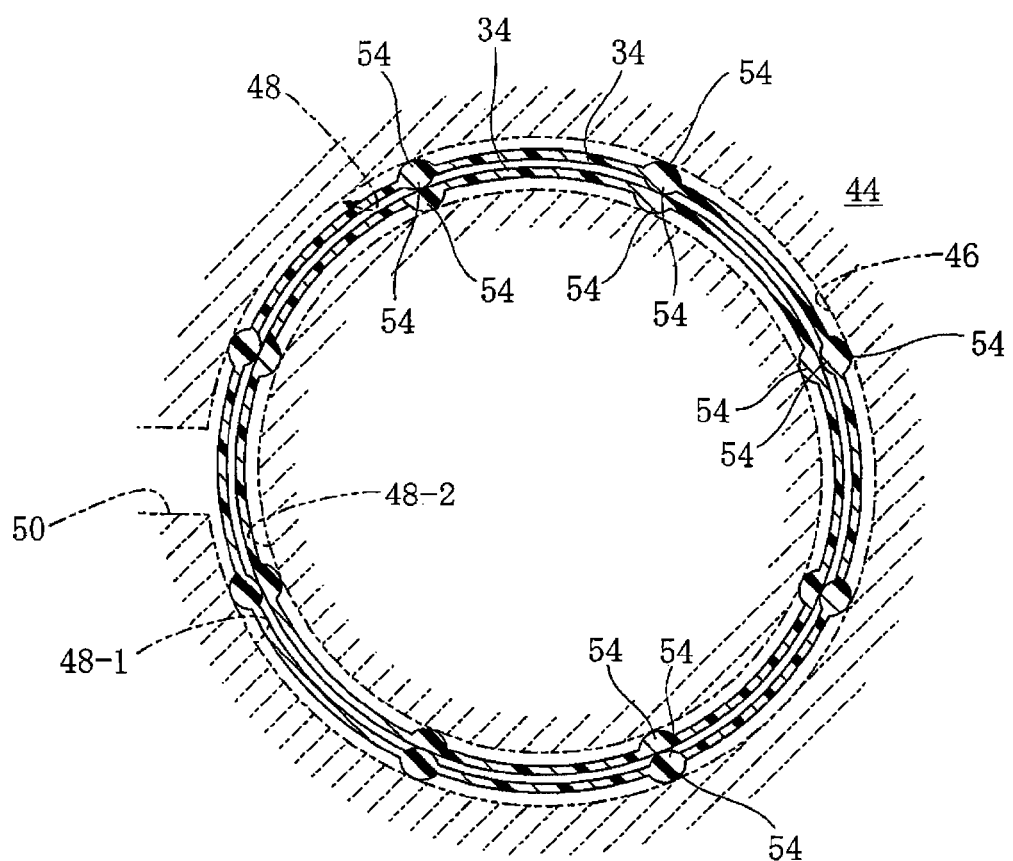
FIG. 17 is a view showing the case that two highly-weldable layers are used
Figure 18A:
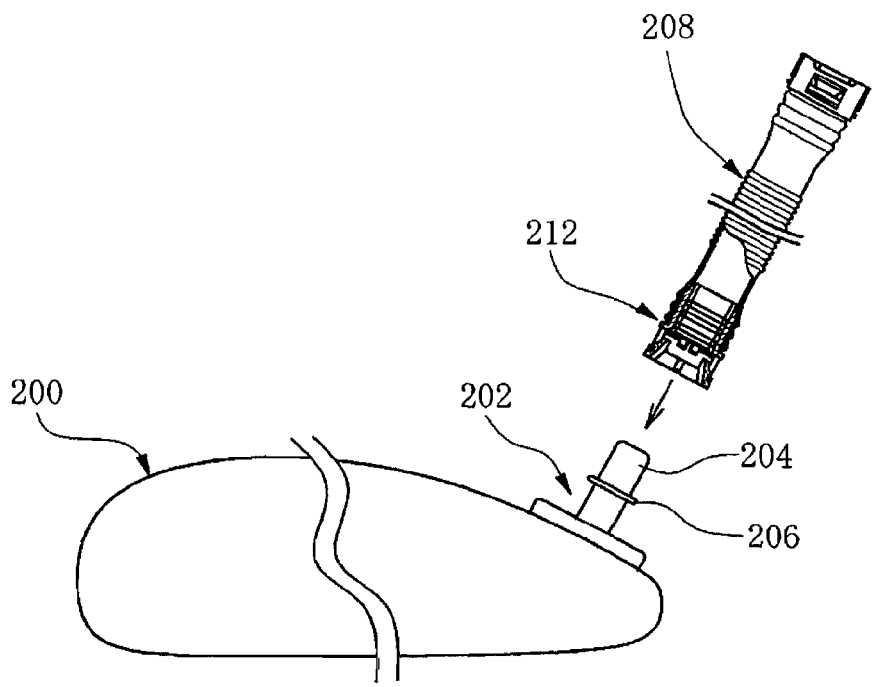
FIG. 18A is a view for explaining a conventional structure for connecting a resin tube to a fuel tank.
Figure 18B:
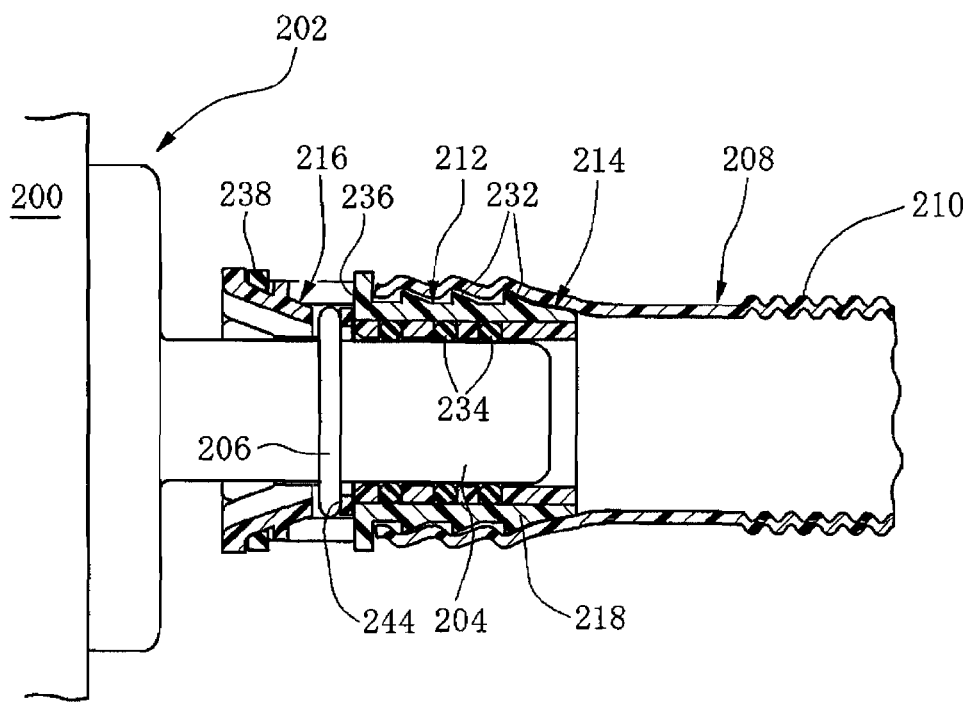
FIG. 18B is a sectional view of the structure of FIG. 18A.
Figure 19:
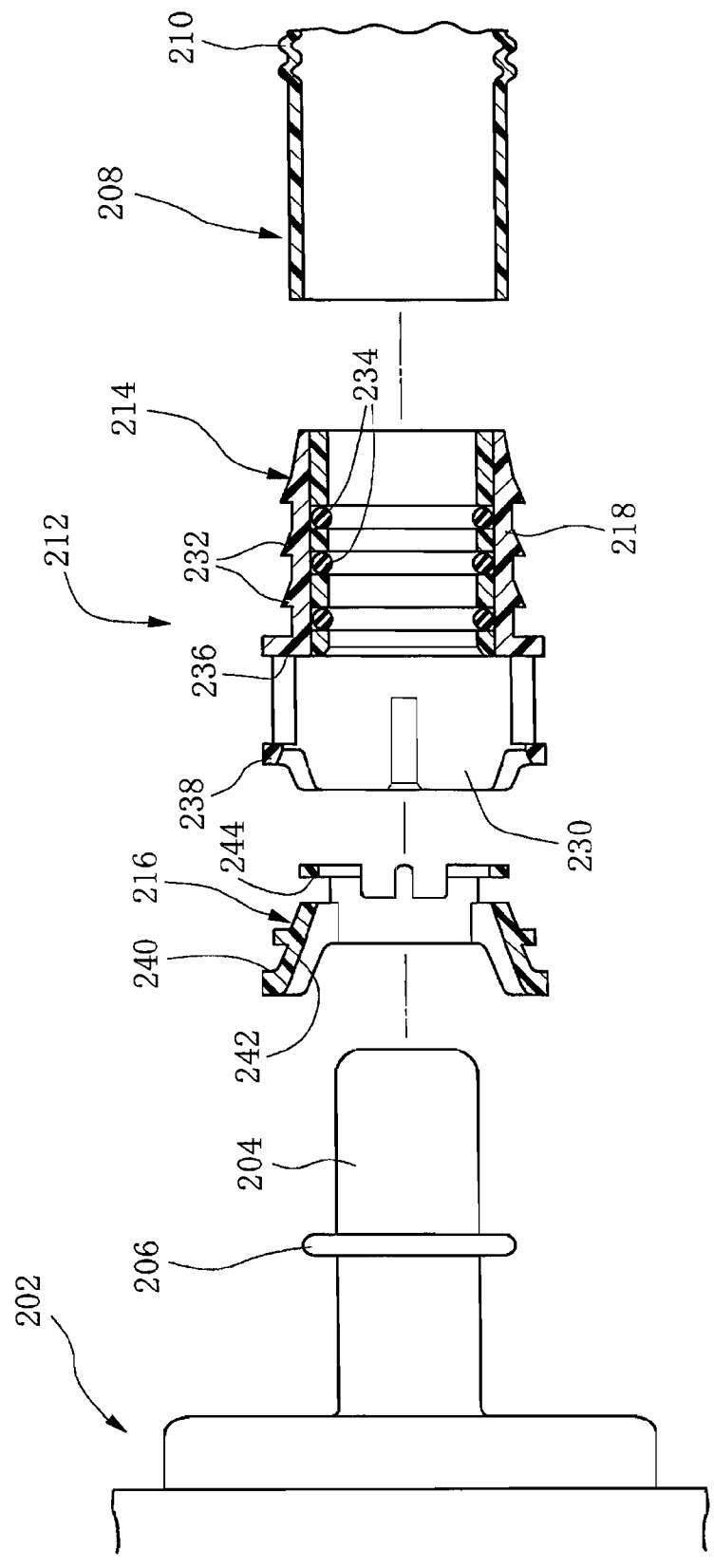
FIG. 19 is an exploded sectional view showing each component in the structure of FIG. 18A.
Figure 20:
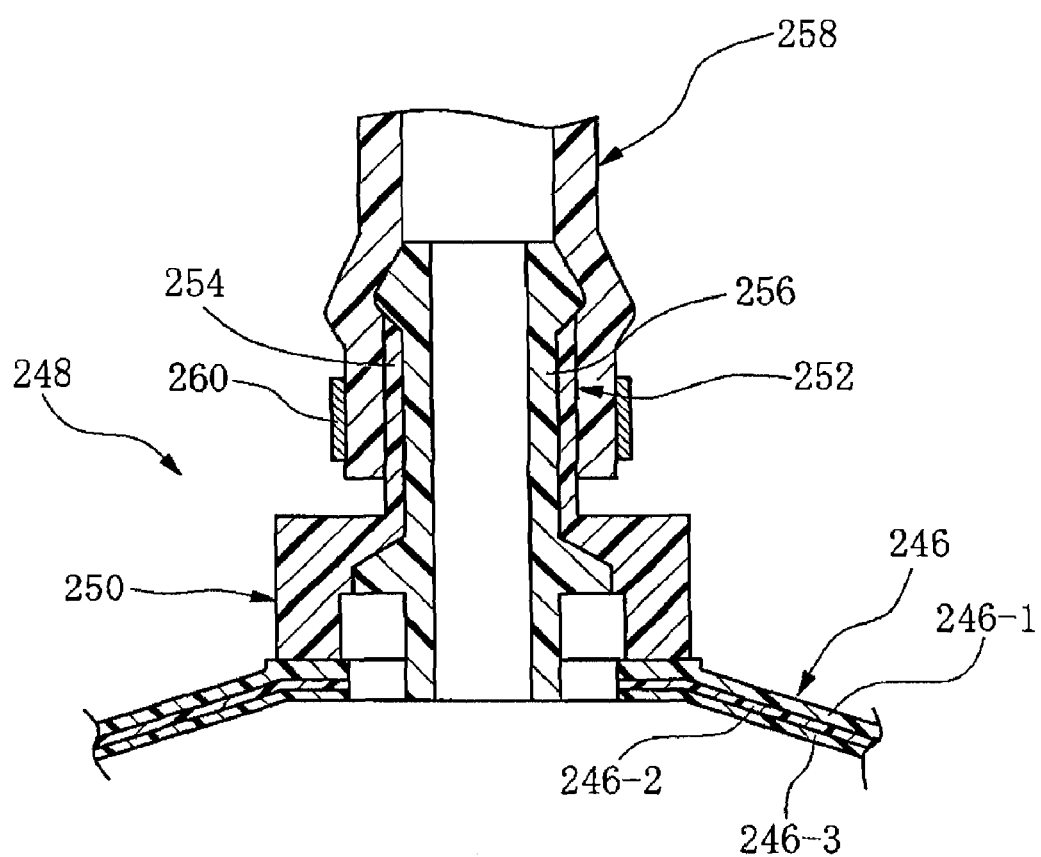
FIG. 20 is a view showing an example of construction of a conventionally known weld joint.
Figure 21:
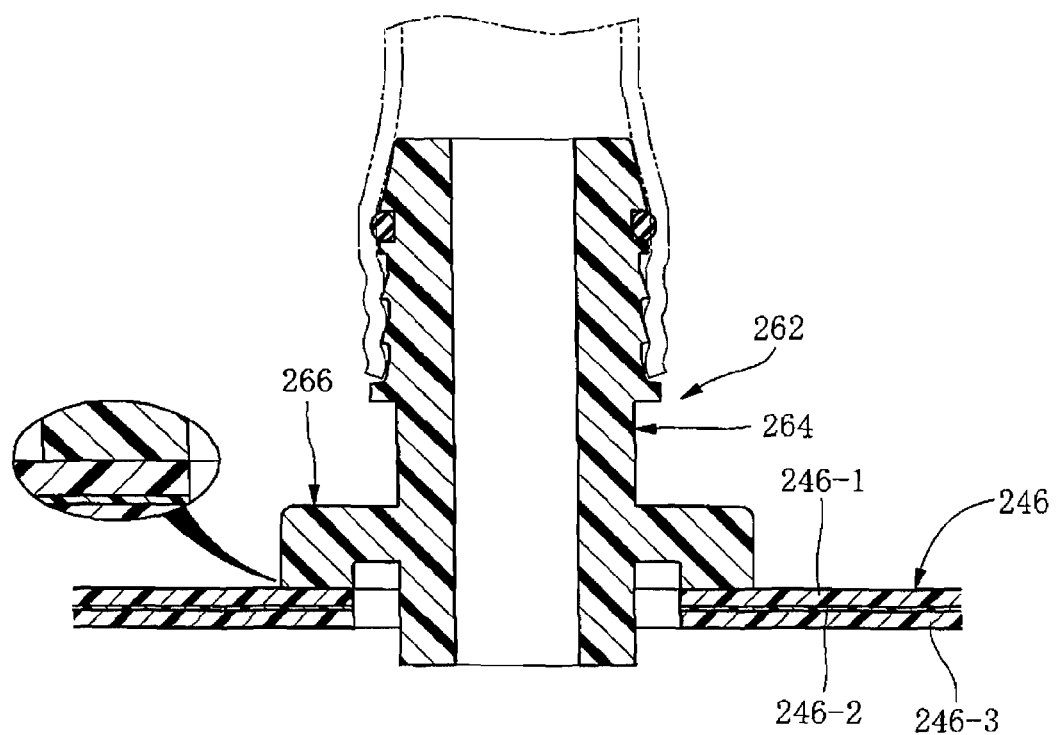
FIG. 21 is a view showing a construction of a conventionally known weld joint, different from that of FIG. 20.

When the middle portion of the extremity portion between outer and inner circumferential portions is formed from the highly-weldable layer 34, the highly-weldable layer 34 may be separated into two layers that are diametrically spaced, namely into an inner highly-weldable layer 34 and an outer highly-weldable layer 34 (refer to FIG. 14). However, in this case, bearing portions 54 are formed additionally on one of the inner and the outer highly-weldable layers in such manner that a leading end of each of the bearing portions 54 contacts against the other of the inner and the outer highly-weldable layers (refer to FIG. 17).

Although the preferred embodiments of the present invention have been described in detail as above, these are some of examples. For example, according to the present invention, preferably a weld joint except for a highly-weldable layer is entirely made of a singe resin alloy material as above. However, according to the circumstances, other material may be formed integrally on an inner surface or an outer surface of a tubular portion of the weld joint. As such, the present invention may be constructed and embodied in various configurations and modes within the scope of the present invention.

What is claimed is:

1. A weld joint adapted for being mounted integrally to a resin fuel tank by heat-welding, the weld joint, comprising:
   a tubular portion for connection to a tube or a connector in piping; and
   a weld portion at a base end portion of the weld joint for being welded and bonded to a rim portion around an opening of the resin fuel tank, the weld portion having a main body and an extremity portion facing the resin fuel tank, the main body of the weld portion being made of a resin alloy material that is obtained by alloying a barrier resin of fuel-impermeability with a modified high-density polyethylene (HDPE) having affinity for the barrier resin, or by alloying the barrier resin with the modified HDPE and HDPE;
   wherein the weld portion includes a highly-weldable layer in the extremity portion of the weld portion facing the resin fuel tank, the highly-weldable layer is made of HDPE and/or a modified HDPE having good weldability to the resin fuel tank, and an extremity end surface of the highly-weldable layer serves as a weld surface for welding the weld portion to the resin fuel tank,
   wherein the extremity portion of the weld portion is formed entirely from the highly-weldable layer throughout an entire circumference of the extremity portion,
      wherein a radial outer peripheral surface of the highly-weldable layer defines a tapered surface that gradually reduces in diameter in a direction away from the extremity end surface of the extremity portion facing the resin fuel tank toward the tubular portion of the weld joint, the resin alloy material is integrally bonded to the highly-weldable layer over the entire tapered surface and a surface of the highly-weldable layer closer to the tubular portion of the weld joint.

2. A weld joint adapted for being mounted integrally to a resin fuel tank by heat-welding, the weld joint, comprising:
   a tubular portion for connection to a tube or a connector in piping; and
   a weld portion at a base end portion of the weld joint for being welded and bonded to a rim portion around an opening of the resin fuel tank, the weld portion having a main body and an extremity portion facing the resin fuel tank, the main body of the weld portion being made of a resin alloy material that is obtained by alloying ethylene-vinyl alcohol copolymer (EVOH) or polyamide (PA) with a modified HDPE obtained by introducing a functional group having high affinity for hydroxyl group of EVOH or amine group of PA into HDPE, or by alloying EVOH or PA with the modified HDPE and HDPE;
   wherein the weld portion includes a highly-weldable layer in the extremity portion of the weld portion facing the resin fuel tank, the highly-weldable layer is made of HDPE and/or a modified HDPE having good weldability to the resin fuel tank, and an extremity end surface of the highly-weldable layer serves as a weld surface for welding the weld portion to the resin fuel tank
   wherein the extremity portion of the weld portion is formed entirely from the highly-weldable layer throughout an entire circumference of the extremity portion,
      wherein a radially outer peripheral surface of the highly-weldable layer defines a tapered surface that gradually reduces in diameter in a direction away from the extremity end surface of the extremity portion facing the resin fuel tank toward the tubular portion of the weld joint, the resin alloy material is integrally bonded to the highly-weldable layer over the entire tapered surface and a surface of the highly-weldable layer closer to the tubular portion of the weld joint.

3. A weld joint adapted for being mounted integrally to a resin fuel tank by heat-welding, the weld joint, comprising:
   a tubular portion for connection to a tube or a connector in piping; and
   a weld portion at a base end portion of the weld joint for being welded and bonded to a rim portion around an opening of the resin fuel tank, the weld portion having a main body and an extremity portion facing the resin fuel tank, the main body of the weld portion being made of a resin alloy material that is obtained by alloying a barrier resin of fuel-impermeability with a modified high-density polyethylene (HDPE) having affinity for the barrier resin, or by alloying the barrier resin with the modified HDPE and HDPE;
   wherein the weld portion has a highly-weldable layer in the extremity portion of the weld portion facing the resin fuel tank, the highly-weldable layer is made of HDPE and/or a modified HDPE having good weldability to the resin fuel tank, and an extremity end surface of the highly-weldable layer serves as a weld surface for welding the weld portion to the resin fuel tank,
   wherein the extremity portion of the weld portion has an outer circumferential portion, an inner circumferential portion, and a middle portion between outer and inner circumferential portions,
   wherein (1) the outer circumferential portion is formed into the highly-weldable layer throughout an entire circumference of the outer circumferential portion and the inner circumferential portion is formed into a resin alloy portion made of the resin alloy material; (2) the inner circumferential portion is formed into the highly-weldable layer throughout an entire circumference of the inner circumferential portion and the outer circumferential portion is formed into the resin alloy portion; or (3) the middle portion is formed into the highly-weldable layer throughout an entire circumference of the middle portion and the outer and inner circumferential portions are formed into the resin alloy portions, extremity end surfaces of the highly-weldable layer and the resin alloy define a weld surface adapted for being welded to the resin fuel tank,
   wherein the highly-weldable layer is provided with bearing portions disposed radially, the bearing portions are adapted to contact against a mold interior surface of a mold for forming the weld joint from the resin alloy material while the highly-weldable layer preformed is placed within the mold prior to injection of the resin alloy material into the mold, deformation of the highly-weldable layer is prevented by the bearing portions contacting against the mold-interior surface during injection of the resin alloy material into the mold,
   wherein the bearing portions extend radially through the resin alloy portion which is integral with the bearing portions and reach to a position of an circumferential surface of the resin alloy portion.

4. A weld joint adapted for being mounted integrally to a resin fuel tank by heat-welding, the weld joint, comprising:
   a tubular portion for connection to a tube or a connector in piping; and a weld portion at a base end portion of the weld joint for being welded and bonded to a rim portion around an opening of the resin fuel tank, the weld portion having a main body and an extremity portion facing the resin fuel tank, the main body of the weld portion being made of a resin alloy material that is obtained by alloying ethylene-vinyl alcohol copolymer (EVOH) or polyamide (PA) with a modified HDPE obtained by introducing a functional group having high affinity for hydroxyl group of EVOH or amine group of PA into HDPE, or by alloying EVOH or PA with the modified HDPE and HDPE;

wherein the weld portion has a highly-weldable layer in the extremity portion of the weld portion facing the resin fuel tank, the highly-weldable layer is made of HDPE and/or a modified HDPE having good weldability to the resin fuel tank, and an extremity end surface of the highly-weldable layer serves as a weld surface for welding the weld portion to the resin fuel tank, wherein the extremity portion of the weld portion has an outer circumferential portion, an inner circumferential portion, and a middle portion between outer and inner circumferential portions, wherein (1) the outer circumferential portion is formed into the highly-weldable layer throughout an entire circumference of the outer circumferential portion and the inner circumferential portion is formed into a resin alloy portion made of the resin alloy material; (2) the inner circumferential portion is formed into the highly-weldable layer throughout an entire circumference of the inner circumferential portion and the outer circumferential portion is formed into the resin alloy portion; or (3) the middle portion is formed into the highly-weldable layer throughout an entire circumference of the middle portion and the outer and inner circumferential portions are formed into the resin alloy portions, extremity end surfaces of the highly-weldable layer and the resin alloy define a weld surface adapted for being welded to the resin fuel tank, wherein the highly-weldable layer is provided with bearing portions disposed radially, the bearing portions are adapted to contact against a mold interior surface of a mold for forming the weld joint from the resin alloy material while the highly-weldable layer preformed is placed within the mold prior to injection of the resin alloy material into the mold, deformation of the highly-weldable layer is prevented by the bearing portions contacting against the mold-interior surface during injection of the resin alloy material into the mold, wherein the bearing portions extend radially through the resin alloy portion which is integral with the bearing portions and reach to a position of a circumferential surface of the resin alloy portion.

5. The weld joint as set forth in claim 3, wherein the inner circumferential portion is formed into the highly-weldable layer throughout the entire circumference of the inner circumferential portion and the outer circumferential portion is formed into the resin alloy portion made of the resin alloy material, the bearing portions are disposed on an outer circumferential surface of the highly-weldable layer, and the bearing portions extend radially outwardly through the resin alloy portion and reach to a position of an outer circumferential surface of the resin alloy portion.

6. The weld joint as set forth in claim 4, wherein the inner circumferential portion is formed into the highly-weldable layer throughout the entire circumference of the inner circumferential portion and the outer circumferential portion is formed into the resin alloy portion made of the resin alloy material, the bearing portions are disposed on an outer circumferential surface of the highly-weldable layer, and the bearing portions extend radially outwardly through the resin alloy portion and reach to a position of an outer circumferential surface of the resin alloy portion.

7. The weld joint as set forth in claim 3, wherein the outer circumferential portion is formed into the highly-weldable layer throughout the entire circumference of the outer circumferential portion and the inner circumferential portion is formed into the resin alloy portion made of the resin alloy material, the bearing portions are disposed on an inner circumferential surface of the highly-weldable layer, and the bearing portions extend radially inwardly through the resin alloy portion and reach to a position of an inner circumferential surface of the resin alloy portion.

8. The weld joint as set forth in claim 4, wherein the outer circumferential portion is formed into the highly-weldable layer throughout the entire circumference of the outer circumferential portion and the inner circumferential portion is formed into the resin alloy portion made of the resin alloy material, the bearing portions are disposed on an inner circumferential surface of the highly-weldable layer, and the bearing portions extend radially inwardly through the resin alloy portion and reach to a position of an inner circumferential surface of the resin alloy portion.

* * * * *